(12) United States Patent
Jang et al.

(10) Patent No.: US 11,680,205 B2
(45) Date of Patent: Jun. 20, 2023

(54) FULL-COLOR-TUNABLE UPCONVERSION NANOPHOSPHOR

(71) Applicant: KOREA INSTITUTE OF SCIENCE AND TECHNOLOGY, Seoul (KR)

(72) Inventors: Ho Seong Jang, Seoul (KR); Gumin Kang, Seoul (KR); A-Ra Hong, Seoul (KR); Seung Yong Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 14 days.

(21) Appl. No.: 17/369,961

(22) Filed: Jul. 8, 2021

(65) Prior Publication Data
US 2022/0064526 A1  Mar. 3, 2022

(30) Foreign Application Priority Data
Aug. 27, 2020 (KR) .......... 10-2020-0108776

(51) Int. Cl.
C09K 11/77 (2006.01)
C09K 11/02 (2006.01)
G01N 21/64 (2006.01)
B82Y 20/00 (2011.01)

(52) U.S. Cl.
CPC .......... *C09K 11/7773* (2013.01); *C09K 11/02* (2013.01); *B82Y 20/00* (2013.01); *G01N 21/64* (2013.01)

(58) Field of Classification Search
CPC ...... C09K 11/7773; C09K 11/02; B82Y 20/00
See application file for complete search history.

(56) References Cited

U.S. PATENT DOCUMENTS 10,167,424 B2    1/2019  Jang et al.
2020/0308484 A1* 10/2020 Jang ................. C09K 11/02

FOREIGN PATENT DOCUMENTS

| CN | 107286924 A | 10/2017 |
| KR | 10-1792800 B1 | 11/2017 |
| KR | 10-2019-0075676 A | 7/2019 |
| KR | 10-2019-0080581 A | 7/2019 |

OTHER PUBLICATIONS

Franois Auzel, "Upconversion and Anti-Stokes Processes with f and d Ions in Solids," Chem. Rev., 2004, pp. 139-173, vol. 104.
Blasse G. Grabmaier B.C., "Radiative Return to the Ground State: Emission," Luminescent Materials, 1994, pp. 40-45, Springer.
Renren Deng et al., "Temporal full-colour tuning through non-steady-state upconversion," Nature Nanotechnology, 2015, pp. 237-242, vol. 10, Macmillan Publishers Limited.
A-Ra Hong et al., "Sub-20 nm LiErF4-Based Upconversion Nanophosphors for Simultaneous Imaging and Photothermal Therapeutics," ACS Appl. Nano Mater. 2020, pp. 8662-8671, American Chemical Society.

(Continued)

*Primary Examiner* — C Melissa Koslow
(74) *Attorney, Agent, or Firm* — Cantor Colburn LLP

(57) ABSTRACT

Provided is a core/multishell tetragonal upconversion nanophosphor capable of being excited by near-infrared (NIR) light having wavelengths of 800±20 nm, 980±20 nm, and 1532±20 nm to emit light of blue, green, red, and combinations thereof.

19 Claims, 22 Drawing Sheets
(2 of 22 Drawing Sheet(s) Filed in Color)

(56) References Cited

OTHER PUBLICATIONS

Hao Lin et al., "A novel upconversion core-multishell nanoplatform for a highly efficient photoswitch," J. Mater. Chem. C, 2020, pp. 3483-3490, The Royal Society of Chemistry.
Korean Office Action for KR Application No. 10-2020-0108776 dated Apr. 7, 2022.
International Search Report dated Dec. 2, 2021 for PCT/KR2021/006820.

* cited by examiner

FULL-COLOR-TUNABLE UPCONVERSION NANOPHOSPHOR

CROSS-REFERENCE TO RELATED PATENT APPLICATION

This application claims the benefit of Korean Patent Application No. 10-2020-0108776, filed on Aug. 27, 2020, in the Korean Intellectual Property Office, the disclosure of which is incorporated herein in its entirety by reference.

BACKGROUND OF THE INVENTION

1 Field of the Invention

The present invention relates to a nanophosphor applicable to anti-counterfeiting code, fluorescent contrast agents, and transparent displays, and a method of synthesizing the same, and more particularly, to a fluoride-based core/multishell tetragonal nanophosphor capable of emitting full-color light based on blue, green, red, and combinations thereof by controlling a wavelength of an applied near-infrared (NIR) laser beam.

2. Description of the Related Art

In most phosphors including nanophosphors, when high-energy light such as ultraviolet (UV) or visible light is received from an external environment, ground-state electrons are excited and then some energy is lost and visible light having a longer wavelength compared to the incident light is emitted. Such a difference between absorption and emission wavelengths is called a Stokes shift. In this case, when some lanthanide elements are doped, luminescence is exhibited through an anti-Stokes shift process in which electrons are excited by infrared (IR) light and light having a shorter wavelength compared to the excitation light, i.e., visible light having higher energy, is emitted. This type of luminescence is called upconversion luminescence in distinction from downconversion luminescence by which emission energy is reduced compared to excitation energy [Chem. Rev. vol. 104, 139-174 (2004)]. An upconversion nanophosphor has a structure in which a lanthanide element is doped on an inorganic host material having a diameter of 100 nm or less. In general, an upconversion nanophosphor doped with trivalent lanthanide ions exhibits a unique emission color depending on the doped lanthanide element regardless of the type of a host material [Luminescent Materials (1994)]. Blue light is emitted when thulium (Tm) is doped on the host material of the nanophosphor, and green or red light is emitted when erbium (Er) or holmium (Ho) is doped. Therefore, to implement a variety of emission colors from the upconversion nanophosphor, particles of various compositions need to be synthesized by changing the composition of the nanophosphor.

However, when upconversion nanophosphors of various compositions are mixed and IR light is radiated thereon, light corresponding to a combination of colors separately emitted from the nanophosphors is ultimately observed. This serves as a restriction when the upconversion nanophosphors are applied to pixels of a transparent three-dimensional display. To solve this problem, a research team led by professor Liu from the National University of Singapore has synthesized a core/quad-shell upconversion nanophosphor capable of emitting light of various colors such as blue, green, red, and white by using two laser beams and a laser pulse controller [Nature Nanotechnology vol. 10, 237-242 (2015)]. However, because the intensity of upconversion luminescence is greatly reduced when the pulse of an applied laser beam is shortened, a variety of emission colors may not be easily implemented while maintaining high brightness. Therefore, when an emission color from a upconversion nanophosphor particle is tunable without changing the pulse of a laser beam applied to the nanophosphor, implementation of various colors in a transparent 3-dimensional display without a reduction in brightness may be expected.

SUMMARY OF THE INVENTION

The present invention provides an upconversion nanophosphor capable of emitting visible light of blue, green, or red depending on a wavelength of an excitation laser beam, and of emitting visible light of various colors by combining wavelengths of the excitation laser beam, by using a tetragonal LiYbF$_4$:Tm nanophosphor as a core, doping the core with a green-emitting shell, and then doping the green-emitting shell with a red-emitting shell. The present invention also provides an upconversion nanophosphor capable of emitting pure blue, green, and red light by providing a crystalline shell between blue, green, and red emitting layers, and of being tuned to various colors and enhancing brightness by providing a crystalline shell at an outermost layer. The present invention also provides an upconversion nanophosphor capable of emitting light of blue, green, red, and various colors by changing compositions of a core and shells exhibiting blue, green, and red luminescence.

According to an embodiment of the present invention, a nanophosphor includes a Tm$^{3+}$-doped fluoride-based nanoparticle represented by Chemical Formula 1.

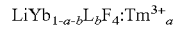  [Chemical Formula 1]

$\text{LiYb}_{1-a-b}\text{L}_b\text{F}_4\text{:Tm}^{3+}{}_a$

In Chemical Formula 1, a is a real number of 0<a≤1, b is a real number of 0≤b≤1 and is satisfying a condition of 0<a+b≤1, and L is any one selected from the group consisting of yttrium (Y), lanthanum (La), cerium (Ce), praseodymium (Pr), neodymium (Nd), promethium (Pm), samarium (Sm), europium (Eu), terbium (Tb), dysprosium (Dy), holmium (Ho), erbium (Er), lutetium (Lu), gadolinium (Gd) and combinations thereof.

The nanophosphor may include a core using the nanoparticle, and a shell provided on the surface of the core and made of a compound represented by Chemical Formula 2.

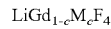  [Chemical Formula 2]

$\text{LiGd}_{1-c}\text{M}_c\text{F}_4$

In Chemical Formula 2, c is a real number of 0≤c≤1, and M is any one selected from the group consisting of rare-earth elements including Y, La, Ce, Pr, Nd, Pm, Sm, Eu, Tb, Dy, Ho, Er, thulium (Tm), ytterbium (Yb), and Lu, and combinations thereof.

The nanophosphor may include a core/shell using the nanoparticle, and a shell provided on the surface of the core/shell and made of a compound represented by Chemical Formula 3.

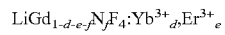  [Chemical Formula 3]

$\text{LiGd}_{1-d-e-f}\text{N}_f\text{F}_4\text{:Yb}^{3+}{}_d,\text{Er}^{3+}{}_e$ In Chemical Formula 3, d is a real number of 0<d≤0.5, and e is a real number of 0<e≤0.5.

In Chemical Formula 3, f is a real number of 0≤f≤1 and is satisfying a condition of 0<d+e+f<1, and N is any one selected from the group consisting of rare-earth elements including Y, La, Ce, Pr, Nd, Pm, Sm, Dy, Ho, Tm, and Lu, and combinations thereof.

The nanophosphor may include a core/shell/shell using the nanoparticle, and a shell provided on the surface of the core/shell/shell and made of a compound represented by Chemical Formula 4.

$$LiY_{1-g-h-i}Q_iF_4:Nd^{3+}_g,Yb^{3+}_h \quad \text{[Chemical Formula 4]}$$

In Chemical Formula 4, g is a real number of 0<g≤1, and h is a real number of 0<h≤0.5 and is satisfying a condition of 0<g+h≤1.

In Chemical Formula 4, i is a real number of 0≤i≤1 and is satisfying a condition of 0≤g+h+i≤1, and Q is any one selected from the group consisting of rare-earth elements including La, Ce, Pr, Pm, Sm, Eu, gadolinium (Gd), Tb, Dy, Ho, Er, Tm, and Lu, and combinations thereof.

The nanophosphor may include a core/shell/shell/shell using the nanoparticle, and a shell provided on the surface of the core/shell/shell/shell and made of a compound represented by Chemical Formula 5.

$$LiGd_{i-j}R_jF_4 \quad \text{[Chemical Formula 5]}$$

In Chemical Formula 5, j is satisfying a condition of a real number of 0≤j≤1.

In Chemical Formula 5, R is any one selected from the group consisting of rare-earth elements including Y, La, Ce, Pr, Nd, Pm, Sm, Eu, Tb, Dy, Ho, Er, Tm, Yb, and Lu, and combinations thereof.

The nanophosphor may include a core/shell/shell/shell/shell using the nanoparticle, and a shell provided on the surface of the core/shell/shell/shell/shell and made of a compound represented by Chemical Formula 6.

$$LiEr_{1-k-l}T_lF_4:Tm^{3+}_k \quad \text{[Chemical Formula 6]}$$

In Chemical Formula 6, k is a real number of 0<k≤0.5, and l is a real number of 0≤l<1 and is satisfying a condition of 0<k+l<1.

In Chemical Formula 6, T is any one selected from the group consisting of rare-earth elements including Y, La, Ce, Pr, Nd, Pm, Sm, Eu, Gd, Tb, Dy, Ho, Yb, and Lu, and combinations thereof.

The nanophosphor may include a core/shell/shell/shell/shell/shell using the nanoparticle, and a shell provided on the surface of the core/shell/shell/shell/shell/shell and made of a compound represented by Chemical Formula 7.

$$LiGd_{1-m}Z_mF_4 \quad \text{[Chemical Formula 7]}$$

In Chemical Formula 7, m is satisfying a condition of a real number of 0≤m≤1.

In Chemical Formula 7, Z is any one selected from the group consisting of rare-earth elements including Y, La, Ce, Pr, Nd, Pm, Sm, Eu, Tb, Dy, Ho, Er, Tm, Yb, and Lu, and combinations thereof.

The nanophosphor may be an upconversion nanophosphor having a core/multishell structure including a core using a nanoparticle represented by Chemical Formula 1, a first shell provided on at least a partial surface of the core and made of a compound represented by Chemical Formula 2, a second shell provided on at least a partial surface of the core and the first shell and made of a compound represented by Chemical Formula 3, a third shell provided on at least a partial surface of the core, the first shell, and the second shell and made of a compound represented by Chemical Formula 4, a fourth shell provided on at least a partial surface of the core, the first shell, the second shell, and the third shell and made of a compound represented by Chemical Formula 5, a fifth shell provided on at least a partial surface of the core, the first shell, the second shell, the third shell, and the fourth shell and made of a compound represented by Chemical Formula 6, and a sixth shell provided on at least a partial surface of the core, the first shell, the second shell, the third shell, the fourth shell, and the fifth shell and made of a compound represented by Chemical Formula 7.

The nanoparticle may have a diameter of 1 nm to 80 nm.

The nanoparticle may have upconversion properties.

BRIEF DESCRIPTION OF THE DRAWINGS

The above and other features and advantages of the present invention will become more apparent by describing in detail embodiments thereof with reference to the attached drawings in which.

DETAILED DESCRIPTION OF THE INVENTION

Figure 1:
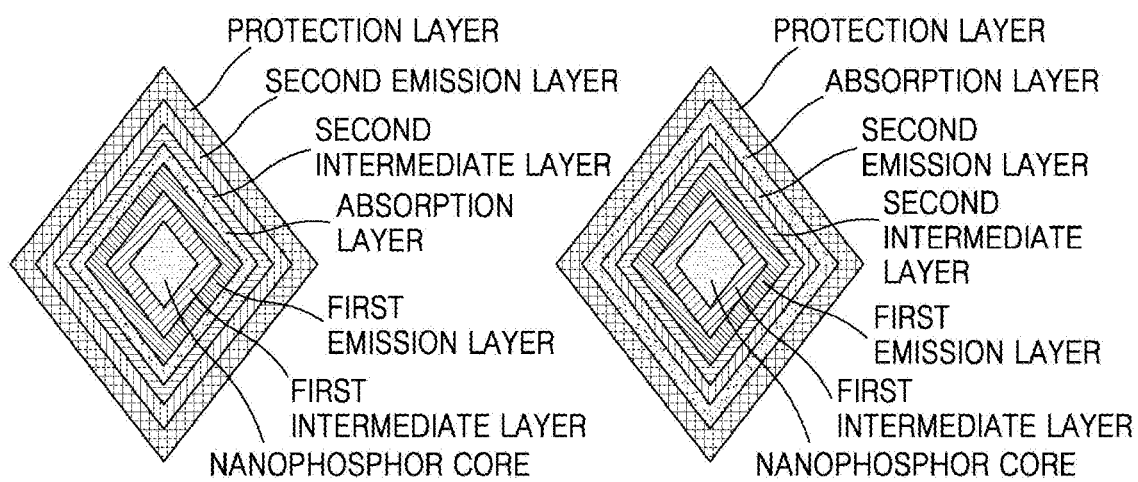
FIG. 1 is a cross-sectional view of core/shell/shell/shell/shell/shell nanophosphors according to embodiments of the present invention.

In this specification, a 'first structure/second structure' refers to a structure in which the second structure is provided on at least a partial surface of the first structure and, for example, the second structure may have a form surrounding at least a part of the first structure. In this case, the first structure may correspond to a core in a core-shell structure, and the second structure may correspond to a shell surrounding at least a part of the core in the core-shell structure.

Furthermore, a 'first structure/second structure/third structure' refers to a structure in which the third structure is provided on at least a partial surface of the first and second structures and, for example, the third structure may have a form surrounding at least a part of the first and second structures. In this case, the first structure may correspond to a core in a core/first shell/second shell structure, the second structure may correspond to a first shell surrounding at least a part of the core in the core/first shell/second shell structure, and the third structure may correspond to a second shell surrounding at least a part of the core and the first shell in the core/first shell/second shell structure.

Meanwhile, based on the above definitions, the present invention may extend to the concept of an $n^{th}$ structure (where n is a positive integer greater than or equal to 4) provided on the first structure/second structure/third structure.

An upconversion nanophosphor according to the technical features of the present invention is a core/multishell tetragonal upconversion nanophosphor capable of being excited by near-infrared (NIR) light having wavelengths of 800±20 nm, 980±20 nm, and 1532±20 nm to emit light of green, blue, and red, respectively. A nanophosphor according to an embodiment of the present invention may be an upconversion nanophosphor including a structure of a blue-emitting core, a green-emitting shell, and a red-emitting shell, wherein the green-emitting shell is provided on at least a partial surface of the blue-emitting core, and the red-emitting shell is provided on at least a partial surface of the blue-emitting core and the green-emitting shell. The nanophosphor may further include a crystalline shell between the blue-emitting core, the green-emitting shell, and the red-emitting shell, and at an outermost layer.

A nanophosphor according to another embodiment of the present invention may be an upconversion nanophosphor including a structure of a blue-emitting core, a red-emitting shell, and a green-emitting shell, wherein the red-emitting shell is provided on at least a partial surface of the blue-emitting core, and the green-emitting shell is provided on at least a partial surface of the blue-emitting core and the red-emitting shell. The nanophosphor may further include a crystalline shell between the blue-emitting core, the red-emitting shell, and the green-emitting shell, and as an outermost shell. A nanophosphor according to still another embodiment of the present invention may be an upconversion nanophosphor including a structure of a red-emitting core, a green-emitting shell, and a blue-emitting shell, wherein the green-emitting shell is provided on at least a partial surface of the red-emitting core, and the blue-emitting shell is provided on at least a partial surface of the red-emitting core and the green-emitting shell. The nanophosphor may further include a crystalline shell between the red-emitting core, the green-emitting shell, and the blue-emitting shell, and as an outermost shell.

A color-tunable $LiYb_{1-a-b}L_bF_4:Tm^{3+}_a/LiGd_{1-c}M_cF_4/LiGd_{1-d-e-f}N_fF_4:Yb^{3+}_d,Er^{3+}_e/LiY_{1-g-h-i}Q_iF_4:Nd^{3+}_g,Yb^{3+}_h/LiGd_{1-j}R_jF_4/LiEr_{1-k-l}T_lF_4:Tm^{3+}_k/LiGd_{1-m}Z_mF_4$ (where a is a real number of $0<a\leq1$, b is a real number of $0\leq b\leq1$ and is satisfying a condition of $0<a+b\leq1$, L is any one selected from the group consisting of yttrium (Y), lanthanum (La), cerium (Ce), praseodymium (Pr), neodymium (Nd), promethium (Pm), samarium (Sm), europium (Eu), terbium (Tb), dysprosium (Dy), holmium (Ho), erbium (Er), lutetium (Lu), gadolinium (Gd) and combinations thereof, c is a real number of $0\leq c\leq1$, M is any one selected from the group consisting of rare-earth elements including Y, La, Ce, Pr, Nd, Pm, Sm, Eu, Tb, Dy, Ho, Er, thulium (Tm), ytterbium (Yb), and Lu, and combinations thereof, d is a real number of $0<d\leq0.5$, e is a real number of $0<e\leq0.5$, f is a real number of $0\leq f\leq1$ and is satisfying a condition of $0<d+e+f<1$, N is any one selected from the group consisting of rare-earth elements including Y, La, Ce, Pr, Nd, Pm, Sm, Dy, Ho, Tm, and Lu, and combinations thereof, g is a real number of $0<g\leq1$, h is a real number of $0<h\leq0.5$ and is satisfying a condition of $0<g+h\leq1$, i is a real number of $0\leq i\leq1$ and is satisfying a condition of $0<g+h+i\leq1$, Q is any one selected from the group consisting of rare-earth elements including La, Ce, Pr, Pm, Sm, Eu, gadolinium (Gd), Tb, Dy, Ho, Er, Tm, and Lu, and combinations thereof, j is satisfying a condition of a real number of $0\leq j\leq1$, R is any one selected from the group consisting of rare-earth elements including Y, La, Ce, Pr, Nd, Pm, Sm, Eu, Tb, Dy, Ho, Er, Tm, Yb, and Lu, and combinations thereof, k is a real number of $0<k\leq0.5$, l is a real number of $0\leq l<1$ and is satisfying a condition of $0<k+l<1$, T is any one selected from the group consisting of rare-earth elements including Y, La, Ce, Pr, Nd, Pm, Sm, Eu, Gd, Tb, Dy, Ho, Yb, and Lu, and combinations thereof, m is satisfying a condition of a real number of $0\leq m\leq1$, and Z is any one selected from the group consisting of rare-earth elements including Y, La, Ce, Pr, Nd, Pm, Sm, Eu, Tb, Dy, Ho, Er, Tm, Yb, and Lu, and combinations thereof) upconversion nanophosphor having a core/shell/shell/shell/shell/shell/shell structure, according to embodiments of the present invention, will now be described with reference to the attached drawings.

FIG. 1 illustrates upconversion nanophosphors according to various embodiments of the present invention.

An upconversion nanophosphor according to an embodiment of the present invention includes a blue-emitting nanophosphor core/crystalline shell (first intermediate layer)/green-emitting shell (first emission layer)/absorption shell (absorption layer)/crystalline shell (second intermediate layer)/red-emitting shell (second emission layer)/crystalline shell (protection layer) structure.

The upconversion nanophosphor according to an embodiment of the present invention is a core/multishell upconversion nanophosphor including a blue-emitting core using a $Tm^{3+}$-doped fluoride-based nanoparticle represented by Chemical Formula 1, a crystalline shell represented by Chemical Formula 2, a green-emitting shell having a $Yb^{3+}$/$Er^{3+}$-co-doped crystalline composition represented by Chemical Formula 3, an absorption shell having a $Nd^{3+}$/$Yb^{3+}$-co-doped crystalline composition represented by Chemical Formula 4, a crystalline shell represented by Chemical Formula 5, a red-emitting shell having a $Tm^{3+}$-doped crystalline composition represented by Chemical Formula 6, and an outermost shell provided as a crystalline shell represented by Chemical Formula 7.

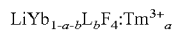

$$LiYb_{1-a-b}L_bF_4:Tm^{3+}_a \qquad \text{[Chemical Formula 1]}$$

(In Chemical Formula 1, a is a real number of $0<a\leq1$, b is a real number of $0\leq b\leq1$ and is satisfying a condition of $0<a+b\leq1$, and L is any one selected from the group consisting of yttrium (Y), lanthanum (La), cerium (Ce), praseodymium (Pr), neodymium (Nd), promethium (Pm), samarium (Sm), europium (Eu), terbium (Tb), dysprosium (Dy), holmium (Ho), erbium (Er), lutetium (Lu), gadolinium (Gd) and combinations thereof.)

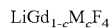

$$LiGd_{1-c}M_cF_4 \qquad \text{[Chemical Formula 2]}$$

(In Chemical Formula 2, c is a real number of $0\leq c\leq1$, and M is any one selected from the group consisting of rare-earth elements including Y, La, Ce, Pr, Nd, Pm, Sm, Eu, Tb, Dy, Ho, Er, thulium (Tm), ytterbium (Yb), and Lu, and combinations thereof.)

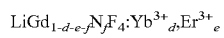

$$LiGd_{1-d-e-f}N_fF_4:Yb^{3+}_d,Er^{3+}_e \qquad \text{[Chemical Formula 3]}$$

(In Chemical Formula 3, d is a real number of $0<d\leq0.5$, e is a real number of $0<e\leq0.5$, f is a real number of $0\leq f\leq1$ and is satisfying a condition of $0<d+e+f<1$, and N is any one selected from the group consisting of rare-earth elements including Y, La, Ce, Pr, Nd, Pm, Sm, Dy, Ho, Tm, and Lu, and combinations thereof.)

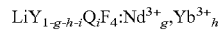

$$LiY_{1-g-h-i}Q_iF_4:Nd^{3+}_g,Yb^{3+}_h \qquad \text{[Chemical Formula 4]}$$

(In Chemical Formula 4, g is a real number of $0<g\leq1$, h is a real number of $0<h\leq0.5$ and is satisfying a condition of $0<g+h\leq1$, i is a real number of $0\leq i\leq1$ and is satisfying a condition of $0\leq g+h+i\leq1$, and Q is any one selected from the group consisting of rare-earth elements including La, Ce, Pr, Pm, Sm, Eu, gadolinium (Gd), Tb, Dy, Ho, Er, Tm, and Lu, and combinations thereof.)

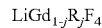

$$LiGd_{1-j}R_jF_4 \qquad \text{[Chemical Formula 5]}$$

(In Chemical Formula 5, j is satisfying a condition of a real number of $0\leq j\leq1$, and R is any one selected from the group consisting of rare-earth elements including Y, La, Ce, Pr, Nd, Pm, Sm, Eu, Tb, Dy, Ho, Er, Tm, Yb, and Lu, and combinations thereof.)

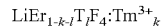

$$LiEr_{1-k-l}T_lF_4:Tm^{3+}_k \qquad \text{[Chemical Formula 6]}$$

(In Chemical Formula 6, k is a real number of $0<k\leq0.5$, l is a real number of $0\leq l<1$ and is satisfying a condition of $0<k+l<1$, and T is any one selected from the group consisting of rare-earth elements including Y, La, Ce, Pr, Nd, Pm, Sm, Eu, Gd, Tb, Dy, Ho, Yb, and Lu, and combinations thereof.)

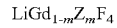

$$LiGd_{1-m}Z_mF_4 \qquad \text{[Chemical Formula 7]}$$

(In Chemical Formula 7, m is satisfying a condition of a real number of $0\leq m\leq1$, and Z is any one selected from the group consisting of rare-earth elements including Y, La, Ce, Pr, Nd, Pm, Sm, Eu, Tb, Dy, Ho, Er, Tm, Yb, and Lu, and combinations thereof.)

The upconversion nanophosphor according to an embodiment of the present invention has a core/multishell structure including a core using a nanoparticle represented by Chemical Formula 1, a first shell provided on at least a partial surface of the core and made of a compound represented by Chemical Formula 2, a second shell provided on at least a partial surface of the core and the first shell and made of a compound represented by Chemical Formula 3, a third shell provided on at least a partial surface of the core, the first shell, and the second shell and made of a compound represented by Chemical Formula 4, a fourth shell provided on at least a partial surface of the core, the first shell, the second shell, and the third shell and made of a compound represented by Chemical Formula 5, a fifth shell provided on at least a partial surface of the core, the first shell, the second shell, the third shell, and the fourth shell and made of a compound represented by Chemical Formula 6, and a sixth shell provided on at least a partial surface of the core, the first shell, the second shell, the third shell, the fourth shell, and the fifth shell and made of a compound represented by Chemical Formula 7.

An upconversion nanophosphor according to another embodiment of the present invention includes a blue-emitting core/crystalline shell (first intermediate layer)/red-emitting shell (first emission layer)/crystalline shell/(second intermediate layer)/green-emitting shell (second emission layer)/absorption shell (absorption layer)/crystalline shell (protection layer) structure.

The upconversion nanophosphor according to another embodiment of the present invention is a core/multishell upconversion nanophosphor including a blue-emitting core using a $Tm^{3+}$-doped fluoride-based nanoparticle represented by Chemical Formula 8, a crystalline shell represented by Chemical Formula 9, a red-emitting shell having a $Tm^{3+}$-doped crystalline composition represented by Chemical Formula 10, a crystalline shell represented by Chemical Formula 11, a green-emitting shell having a $Yb^{3+}/Er^{3+}$-co-doped crystalline composition represented by Chemical Formula 12, an absorption shell having a $Nd^{3+}/Yb^{3+}$-co-doped crystalline composition represented by Chemical Formula 13, and an outermost shell provided as a crystalline shell represented by Chemical Formula 14.

$$LiYb_{1-a-b}L_bF_4:Tm^{3+}_a \quad \text{[Chemical Formula 8]}$$

(In Chemical Formula 8, a is a real number of $0<a\le 1$, b is a real number of $0\le b\le 1$ and is satisfying $0<a+b\le 1$, and L is any one selected from the group consisting of Y, La, Ce, Pr, Nd, Pm, Sm, Eu, Tb, Dy, Ho, Er, Lu, Gd and combinations thereof.)

$$LiGd_{1-c}M_cF_4 \quad \text{[Chemical Formula 9]}$$

(In Chemical Formula 9, c is a real number of $0\le c\le 1$, and M is any one selected from the group consisting of rare-earth elements including Y, La, Ce, Pr, Nd, Pm, Sm, Eu, Tb, Dy, Ho, Er, Tm, Yb, and Lu, and combinations thereof.)

$$LiEr_{1-k-l}T_lF_4:Tm^{3+}_k \quad \text{[Chemical Formula 10]}$$

(In Chemical Formula 10, k is a real number of $0<k\le 0.5$, l is a real number of $0\le l<1$ and is satisfying a condition of $0<k+l<1$, and T is any one selected from the group consisting of rare-earth elements including Y, La, Ce, Pr, Nd, Pm, Sm, Eu, Gd, Tb, Dy, Ho, Yb, and Lu, and combinations thereof.)

$$LiGd_{1-m}Z_mF_4 \quad \text{[Chemical Formula 11]}$$

(In Chemical Formula 11, m is satisfying a condition of a real number of $0\le m\le 1$, and Z is any one selected from the group consisting of rare-earth elements including Y, La, Ce, Pr, Nd, Pm, Sm, Eu, Tb, Dy, Ho, Er, Tm, Yb, and Lu, and combinations thereof.)

$$LiGd_{1-d-e-f}N_fF_4:Yb^{3+}_d,Er^{3+}_e \quad \text{[Chemical Formula 12]}$$

(In Chemical Formula 12, d is a real number of $0<d\le 0.5$, e is a real number of $0<e\le 0.5$, f is a real number of $0\le f\le 1$ and is satisfying a condition of $0<d+e+f<1$, and N is any one selected from the group consisting of rare-earth elements including Y, La, Ce, Pr, Nd, Pm, Sm, Dy, Ho, Tm, and Lu, and combinations thereof.)

$$LiY_{1-g-h-i}Q_iF_4:Nd^{3+}_g,Yb^{3+}_h \quad \text{[Chemical Formula 13]}$$

(In Chemical Formula 13, g is a real number of $0<g\le 1$, h is a real number of $0<h\le 0.5$ and is satisfying a condition of $0<g+h\le 1$, i is a real number of $0\le i\le 1$ and is satisfying a condition of $0<g+h+i\le 1$, and Q is any one selected from the group consisting of rare-earth elements including La, Ce, Pr, Pm, Sm, Eu, Gd, Tb, Dy, Ho, Er, Tm, and Lu, and combinations thereof.)

$$LiGd_{1-j}R_jF_4 \quad \text{[Chemical Formula 14]}$$

(In Chemical Formula 14, j is satisfying a condition of a real number of $0\le j\le 1$, and R is any one selected from the group consisting of rare-earth elements including Y, La, Ce, Pr, Nd, Pm, Sm, Eu, Tb, Dy, Ho, Er, Tm, Yb, and Lu, and combinations thereof.)

The upconversion nanophosphor according to another embodiment of the present invention has a core/multishell structure including a core using a nanoparticle represented by Chemical Formula 8, a first shell provided on at least a partial surface of the core and made of a compound represented by Chemical Formula 9, a second shell provided on at least a partial surface of the core and the first shell and made of a compound represented by Chemical Formula 10, a third shell provided on at least a partial surface of the core, the first shell, and the second shell and made of a compound represented by Chemical Formula 11, a fourth shell provided on at least a partial surface of the core, the first shell, the second shell, and the third shell and made of a compound represented by Chemical Formula 12, a fifth shell provided on at least a partial surface of the core, the first shell, the second shell, the third shell, and the fourth shell and made of a compound represented by Chemical Formula 13, and a sixth shell provided on at least a partial surface of the core, the first shell, the second shell, the third shell, the fourth shell, and the fifth shell and made of a compound represented by Chemical Formula 14.

An upconversion nanophosphor according to still another embodiment of the present invention includes a red-emitting core/crystalline shell (first intermediate layer)/green-emitting shell (first emission layer)/absorption shell (absorption layer)/crystalline shell (second intermediate layer)/blue-emitting shell (second emission layer)/crystalline shell (protection layer) structure.

The upconversion nanophosphor according to still another embodiment of the present invention includes a red-emitting core using a $Tm^{3+}$-doped fluoride-based nanoparticle represented by Chemical Formula 15, a crystalline shell represented by Chemical Formula 16, a green-emitting shell having a $Yb^{3+}/Er^{3+}$-co-doped crystalline composition represented by Chemical Formula 17, an absorption shell having a $Nd^{3+}/Yb^{3+}$-co-doped crystalline composition represented by Chemical Formula 18, a crystalline shell represented by Chemical Formula 19, a blue-emitting shell having a $Tm^{3+}$-doped crystalline composition represented by Chemical Formula 20, and an outermost shell provided as a crystalline shell represented by Chemical Formula 21.

$$LiEr_{1-k-l}T_lF_4:Tm^{3+}_k \quad \text{[Chemical Formula 15]}$$

(In Chemical Formula 15, k is a real number of $0<k\le 0.5$, l is a real number of $0\le l<1$ and is satisfying a condition of $0<k+l<1$, and T is any one selected from the group consisting of rare-earth elements including Y, La, Ce, Pr, Nd, Pm, Sm, Eu, Gd, Tb, Dy, Ho, Yb, and Lu, and combinations thereof.)

$$LiGd_{1-c}M_cF_4 \quad \text{[Chemical Formula 16]}$$

(In Chemical Formula 16, c is a real number of $0\le c\le 1$, and M is any one selected from the group consisting of rare-earth elements including Y, La, Ce, Pr, Nd, Pm, Sm, Eu, Tb, Dy, Ho, Er, Tm, Yb, and Lu, and combinations thereof.)

$$LiGd_{1-d-e-f}N_fF_4:Yb^{3+}_d,Er^{3+}_e \quad \text{[Chemical Formula 17]}$$

(In Chemical Formula 17, d is a real number of $0<d\le 0.5$, e is a real number of $0<e\le 0.5$, f is a real number of $0\le f\le 1$ and is satisfying a condition of $0<d+e+f<1$, and N is any one selected from the group consisting of rare-earth elements including Y, La, Ce, Pr, Nd, Pm, Sm, Dy, Ho, Tm, and Lu, and combinations thereof.)

$$LiY_{1-g-h-i}Q_iF_4:Nd^{3+}_g,Yb^{3+}_h \quad \text{[Chemical Formula 18]}$$

(In Chemical Formula 18, g is a real number of $0<g\le 1$, h is a real number of $0<h\le 0.5$ and is satisfying a condition of $0<g+h\le 1$, i is a real number of $0\le i\le 1$ and is satisfying a condition of $0<g+h+i\le 1$, and Q is any one selected from the group consisting of rare-earth elements including La, Ce, Pr, Pm, Sm, Eu, Gd, Tb, Dy, Ho, Er, Tm, and Lu, and combinations thereof.)

$$LiGd_{1-j}R_jF_4 \qquad \text{[Chemical Formula 19]}$$

(In Chemical Formula 19, j is satisfying a condition of a real number of $0 \leq j \leq 1$, and R is any one selected from the group consisting of rare-earth elements including Y, La, Ce, Pr, Nd, Pm, Sm, Eu, Tb, Dy, Ho, Er, Tm, Yb, and Lu, and combinations thereof.)

$$LiYb_{1-a-b}L_bF_4:Tm^{3+}{}_a \qquad \text{[Chemical Formula 20]}$$

(In Chemical Formula 20, a is a real number of $0<a \leq 1$, b is a real number of $0 \leq b \leq 1$ and is satisfying $0<a+b \leq 1$, and L is any one selected from the group consisting of Y, La, Ce, Pr, Nd, Pm, Sm, Eu, Tb, Dy, Ho, Er, Lu, Gd and combinations thereof.)

$$LiGd_{1-m}Z_mF_4 \qquad \text{[Chemical Formula 21]}$$

(In Chemical Formula 21, m is satisfying a condition of a real number of $0 \leq m \leq 1$, and Z is any one selected from the group consisting of rare-earth elements including Y, La, Ce, Pr, Nd, Pm, Sm, Eu, Tb, Dy, Ho, Er, Tm, Yb, and Lu, and combinations thereof.)

The upconversion nanophosphor according to still another embodiment of the present invention has a core/multishell structure including a core using a nanoparticle represented by Chemical Formula 15, a first shell provided on at least a partial surface of the core and made of a compound represented by Chemical Formula 16, a second shell provided on at least a partial surface of the core and the first shell and made of a compound represented by Chemical Formula 17, a third shell provided on at least a partial surface of the core, the first shell, and the second shell and made of a compound represented by Chemical Formula 18, a fourth shell provided on at least a partial surface of the core, the first shell, the second shell, and the third shell and made of a compound represented by Chemical Formula 19, a fifth shell provided on at least a partial surface of the core, the first shell, the second shell, the third shell, and the fourth shell and made of a compound represented by Chemical Formula 20, and a sixth shell provided on at least a partial surface of the core, the first shell, the second shell, the third shell, the fourth shell, and the fifth shell and made of a compound represented by Chemical Formula 21.

The scope of the present invention is not limited to the afore-described embodiments, and may also be easily applied to other embodiments by adding or substituting constituent elements.

However, the present invention should not be construed as being limited to the embodiments described above and illustrated in the drawings; rather, these embodiments are provided so that this disclosure will be thorough and complete.

A method of synthesizing a core/shell/shell/shell/shell/shell/shell upconversion full-color-emitting fluoride-based nanophosphor, according to embodiments of the present invention, will now be described in detail. For convenience, the core/shell/shell/shell/shell/shell/shell structure may be understood as a core/first shell/second shell/third shell/fourth shell/fifth shell/sixth shell structure.

<Embodiment 1> Synthesis of Upconversion Core Nanophosphor Doped with 0.99 Mmol of $Yb^{3+}$ and 0.01 Mmol of $Tm^{3+}$ 0.99 mmol of ytterbium chloride hydrate ($YbCl_3 \cdot 6H_2O$), 0.01 mmol of thulium chloride hydrate ($TmCl_3 \cdot 6H_2O$), and 3.1 mmol of sodium oleate ($C_{18}H_{33}O_2Na$) were weighed, a certain amount of a mixed solvent of water, ethanol, and hexane was added, and then heat treatment was performed at 70° C. to form a lanthanide complex (a complex formation step). The complex was mixed with a solution including oleic acid and 1-octadecene and heat treatment was performed at 150° C. for 30 minutes to produce a mixed solution including the lanthanide complex (a first mixed solution production step).

10 ml of a methanol solution including 2.5 mmol of lithium hydroxide and 4 mmol of ammonium fluoride was produced (a second mixed solution production step) and then was mixed with the mixed solution including the lanthanide complex (a reaction solution production step).

Figure 2:
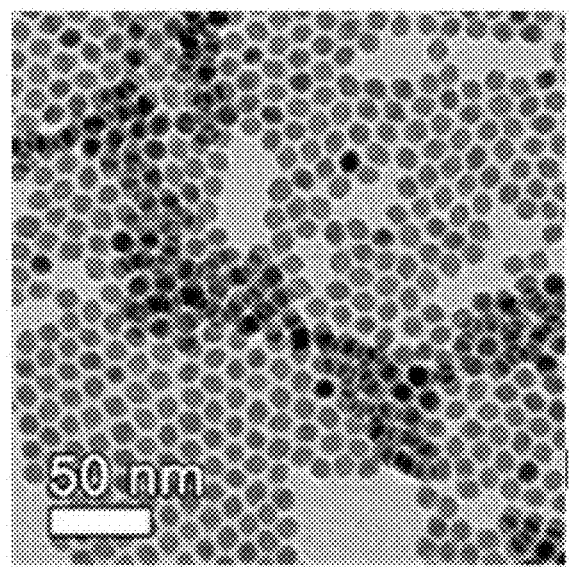
FIG. 2 is a transmission electron microscope (TEM) image of core nanoparticles according to an embodiment of the present invention.

After sufficiently mixed, methanol was removed and then heat treatment was performed in an inert gas atmosphere. In this case, when the temperature of heat treatment was lower than 200° C., single-phase tetragonal nanocrystals might not be completely formed and thus the phosphor might not exhibit intense luminescence. When the temperature of heat treatment was higher than 370° C., aggregation of particles due to overreaction might lead to very large and non-uniform particle diameters and thus a reduction in brightness may be caused. Therefore, the temperature of heat treatment might be 200° C. to 370° C. and the time of heat treatment might be 10 minutes to 4 hours (a nanoparticle formation step). After the heat treatment process was finished and a cooling process was performed to room temperature, a colloidal nanophosphor having a particle diameter of 1 nm to 20 nm was obtained. The nanophosphor obtained as described above was washed with acetone or ethanol and then was dispersed and stored in a non-polar solvent such as hexane, toluene, or chloroform. FIG. 2 is a transmission electron microscope (TEM) image of the upconversion nanophosphor synthesized in Embodiment 1, and shows that a core nanophosphor having a uniform diameter of about 10 nm is synthesized.

<Embodiment 2> Synthesis of Core/Shell Upconversion Nanophosphor by Forming Fluoride Shell A core/shell nanophosphor including cores using the $LiYb_{0.99}F_4:Tm^{3+}{}_{0.01}$ nanoparticles synthesized in Embodiment 1, and further including a fluoride compound was synthesized. For convenience, the core/shell structure may be understood as a core/first shell structure.

2 mmol of gadolinium chloride hydrate ($GdCl_3 \cdot 6H_2O$) was mixed with a solution including oleic acid and 1-octadecene and heat treatment was performed at 150° C. for 30 minutes to produce a mixed solution including a lanthanide complex (a first mixed solution production step).

The first mixed solution was mixed with the solution including the $LiYb_{0.99}F_4:Tm^{3+}{}_{0.01}$ nanoparticles synthesized in Embodiment 1, to produce a second mixed solution.

20 ml of a methanol solution including 5 mmol of lithium hydroxide and 8 mmol of ammonium fluoride was produced (a third mixed solution production step) and then was mixed with the mixed solution including the lanthanide complex (a reaction solution production step).

After sufficiently mixed, methanol was removed and then heat treatment was performed in an inert gas atmosphere. In this case, when the temperature of heat treatment was lower than 200° C., single-phase tetragonal nanocrystals might not be completely formed and thus the phosphor might not exhibit intense luminescence. When the temperature of heat treatment was higher than 370° C., aggregation of particles due to overreaction might lead to very large and non-uniform particle diameters and thus a reduction in brightness may be caused. Therefore, the temperature of heat treatment might be 200° C. to 370° C. and the time of heat treatment might be 10 minutes to 4 hours (a nanoparticle formation step). After the heat treatment process was finished and a cooling process was performed to room temperature, a colloidal nanophosphor having a particle diameter of 1 nm to 30 nm was obtained. The nanophosphor obtained as described above was washed with acetone or ethanol and then was dispersed and stored in a non-polar solvent such as hexane, toluene, or chloroform.

Figure 3:
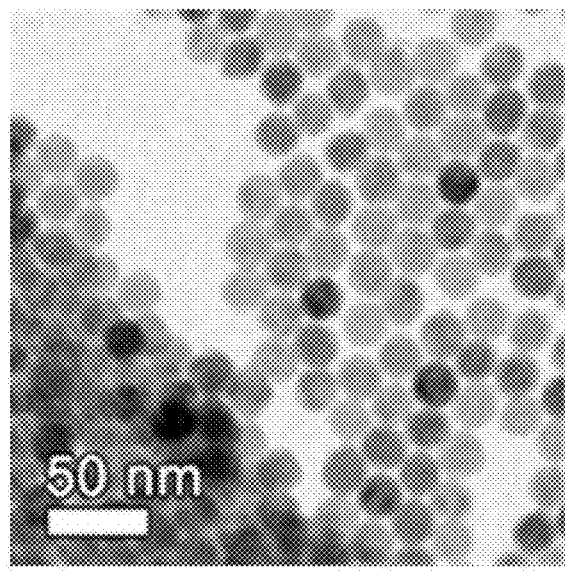
FIG. 3 is a TEM image of core/shell nanoparticles according to an embodiment of the present invention.

FIG. 3 is a TEM image of the core/shell upconversion nanophosphor synthesized in Embodiment 2, and shows that a core/shell upconversion nanophosphor having a uniform diameter of about 21 nm is synthesized.

<Embodiment 3> Synthesis of Core/Shell/Shell Upconversion Nanophosphor

A core/shell/shell nanophosphor including cores using the $LiYb_{0.99}F_4:Tm^{3+}{}_{0.01}/LiGdF_4$ nanoparticles synthesized in Embodiment 2, and further including a $LiGdF_4:Yb^{3+},Er^{3+}$ compound was synthesized. For convenience, the core/shell/shell structure may be understood as a core/first shell/second shell structure.

0.80 mmol of gadolinium chloride hydrate ($GdCl_3.6H_2O$), 0.18 mmol of ytterbium chloride hydrate ($YbCl_3.6H_2O$), and 0.02 mmol of erbium chloride hydrate ($ErCl_3.6H_2O$) were mixed with a solution including oleic acid and 1-octadecene and heat treatment was performed at 150° C. for 30 minutes to produce a mixed solution including a lanthanide complex (a first mixed solution production step).

The first mixed solution was mixed with the solution including the $LiYbF_4:Tm^{3+}/LiGdF_4$ nanoparticles synthesized in Embodiment 2, to produce a second mixed solution.

10 ml of a methanol solution including 2.5 mmol of lithium hydroxide and 4 mmol of ammonium fluoride was produced (a third mixed solution production step) and then was mixed with the mixed solution including the lanthanide complex (a reaction solution production step).

After sufficiently mixed, methanol was removed and then heat treatment was performed in an inert gas atmosphere. In this case, when the temperature of heat treatment was lower than 200° C., single-phase tetragonal nanocrystals might not be completely formed and thus the phosphor might not exhibit intense luminescence. When the temperature of heat treatment was higher than 370° C., aggregation of particles due to overreaction might lead to very large and non-uniform particle diameters and thus a reduction in brightness may be caused. Therefore, the temperature of heat treatment might be 200° C. to 370° C. and the time of heat treatment might be 10 minutes to 4 hours (a nanoparticle formation step). After the heat treatment process was finished and a cooling process was performed to room temperature, a colloidal nanophosphor having a particle diameter of 1 nm to 40 nm was obtained. The nanophosphor obtained as described above was washed with acetone or ethanol and then was dispersed and stored in a non-polar solvent such as hexane, toluene, or chloroform.

Figure 4:
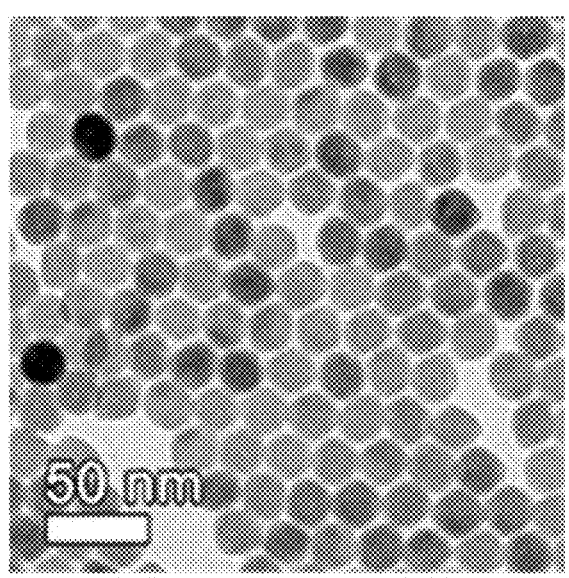
FIG. 4 is a TEM image of core/shell/shell nanoparticles according to an embodiment of the present invention.

FIG. 4 is a TEM image of the core/shell/shell upconversion nanophosphor synthesized in Embodiment 3 of the present invention, and shows that a particle diameter is additionally increased due to a shell formed around the core/shell structure.

<Embodiment 4> Synthesis of Core/Shell/Shell/Shell Upconversion Nanophosphor

A core/shell/shell/shell nanophosphor including cores using the $LiYbF_4:Tm^{3+}/LiGdF_4/LiGdF_4:Yb^{3+},Er^{3+}$ nanoparticles synthesized in Embodiment 3, and further including a $LiYF_4:Nd^{3+},Yb^{3+}$ compound was synthesized. For convenience, the core/shell/shell/shell structure may be understood as a core/first shell/second shell/third shell structure.

1.1 mmol of yttrium chloride hydrate ($YCl_3.6H_2O$), 0.8 mmol of neodymium chloride hydrate ($NdCl_3.6H_2O$), and 0.1 mmol of ytterbium chloride hydrate ($YbCl_3.6H_2O$) were mixed with a solution including oleic acid and 1-octadecene and heat treatment was performed at 150° C. for 30 minutes to produce a mixed solution including a lanthanide complex (a first mixed solution production step).

The first mixed solution was mixed with the solution including the $LiYbF_4:Tm^{3+}/LiGdF_4/LiGdF_4:Yb^{3+},Er^{3+}$ nanoparticles synthesized in Embodiment 3, to produce a second mixed solution.

20 ml of a methanol solution including 5 mmol of lithium hydroxide and 8 mmol of ammonium fluoride was produced (a third mixed solution production step) and then was mixed with the mixed solution including the lanthanide complex (a reaction solution production step).

After sufficiently mixed, methanol was removed and then heat treatment was performed in an inert gas atmosphere. In this case, when the temperature of heat treatment was lower than 200° C., single-phase tetragonal nanocrystals might not be completely formed and thus the phosphor might not exhibit intense luminescence. When the temperature of heat treatment was higher than 370° C., aggregation of particles due to overreaction might lead to very large and non-uniform particle diameters and thus a reduction in brightness may be caused. Therefore, the temperature of heat treatment might be 200° C. to 370° C. and the time of heat treatment might be 10 minutes to 4 hours (a nanoparticle formation step). After the heat treatment process was finished and a cooling process was performed to room temperature, a colloidal nanophosphor having a particle diameter of 1 nm to 50 nm was obtained. The nanophosphor obtained as described above was washed with acetone or ethanol and then was dispersed and stored in a non-polar solvent such as hexane, toluene, or chloroform.

Figure 5:
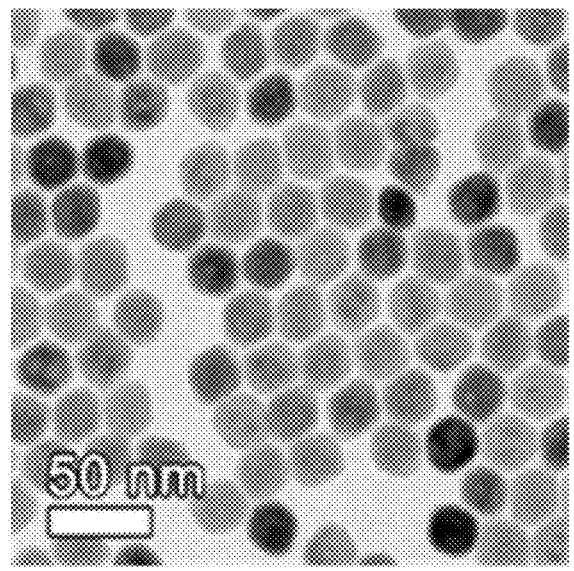
FIG. 5 is a TEM image of core/shell/shell/shell nanoparticles according to an embodiment of the present invention.

FIG. 5 is a TEM image of the core/shell/shell/shell upconversion nanophosphor synthesized in Embodiment 4 of the present invention, and shows that a particle diameter is additionally increased due to a shell formed around the core/shell/shell structure.

<Embodiment 5> Synthesis of Core/Shell/Shell/Shell/Shell Upconversion Nanophosphor A core/shell/shell/shell/shell nanophosphor including cores using the $LiYbF_4:Tm^{3+}/LiGdF_4/LiGdF_4:Yb^{3+},Er^{3+}/LiYF_4:Nd^{3+},Yb^{3+}$ nanoparticles synthesized in Embodiment 4, and further including a $LiGdF_4$ compound was synthesized. For convenience, the core/shell/shell/shell/shell structure may be understood as a core/first shell/second shell/third shell/fourth shell structure.

2 mmol of gadolinium chloride hydrate ($GdCl_3.6H_2O$) was mixed with a solution including oleic acid and 1-octadecene and heat treatment was performed at 150° C. for 30 minutes to produce a mixed solution including a lanthanide complex (a first mixed solution production step).

The first mixed solution was mixed with the solution including the LiYbF$_4$:Tm$^{3+}$/LiGdF$_4$/LiGdF$_4$:Yb$^{3+}$,Er$^{3+}$/LiYF$_4$:Nd$^{3+}$,Yb$^{3+}$ nanoparticles synthesized in Embodiment 4, to produce a second mixed solution.

20 ml of a methanol solution including 5 mmol of lithium hydroxide and 8 mmol of ammonium fluoride was produced (a third mixed solution production step) and then was mixed with the mixed solution including the lanthanide complex (a reaction solution production step).

After sufficiently mixed, methanol was removed and then heat treatment was performed in an inert gas atmosphere. In this case, when the temperature of heat treatment was lower than 200° C., single-phase tetragonal nanocrystals might not be completely formed and thus the phosphor might not exhibit intense luminescence. When the temperature of heat treatment was higher than 370° C., aggregation of particles due to overreaction might lead to very large and non-uniform particle diameters and thus a reduction in brightness may be caused. Therefore, the temperature of heat treatment might be 200° C. to 370° C. and the time of heat treatment might be 10 minutes to 4 hours (a nanoparticle formation step). After the heat treatment process was finished and a cooling process was performed to room temperature, a colloidal nanophosphor having a particle diameter of 1 nm to 60 nm was obtained. The nanophosphor obtained as described above was washed with acetone or ethanol and then was dispersed and stored in a non-polar solvent such as hexane, toluene, or chloroform.

Figure 6:
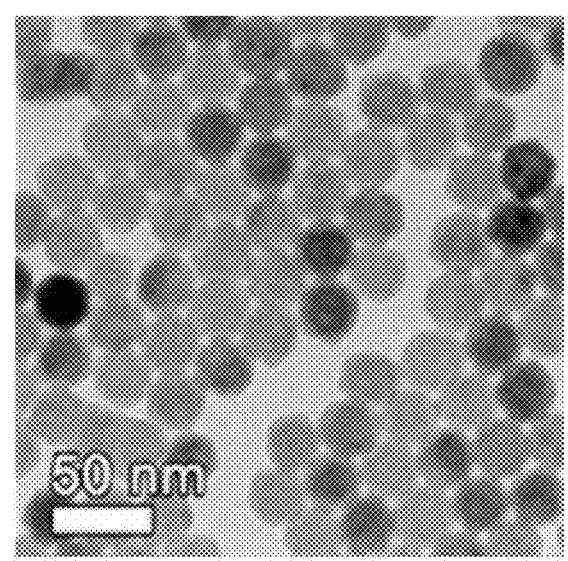
FIG. 6 is a TEM image of core/shell/shell/shell/shell nanoparticles according to an embodiment of the present invention.

FIG. 6 is a TEM image of the core/shell/shell/shell/shell upconversion nanophosphor synthesized in Embodiment 5 of the present invention, and shows that a particle diameter is additionally increased due to a shell formed around the core/shell/shell/shell structure.

<Embodiment 6> Synthesis of Core/Shell/Shell/Shell/Shell/Shell Light-Emitting Upconversion Nanophosphor A core/shell/shell/shell/shell/shell nanophosphor including cores using the LiYbF$_4$:Tm$^{3+}$/LiGdF$_4$/LiGdF$_4$:Yb$^{3+}$,Er$^{3+}$/LiYF$_4$:Nd$^{3+}$,Yb$^{3+}$/LiGdF$_4$ nanoparticles synthesized in Embodiment 5, and further including a LiErF$_4$:Tm$^{3+}$ compound was synthesized. For convenience, the core/shell/shell/shell/shell/shell structure may be understood as a core/first shell/second shell/third shell/fourth shell/fifth shell structure.

0.997 mmol of erbium chloride hydrate (ErCl$_3$.6H$_2$O) and 0.003 mmol of thulium chloride hydrate (TmCl$_3$.6H$_2$O) were mixed with a solution including oleic acid and 1-octadecene and heat treatment was performed at 150° C. for 30 minutes to produce a mixed solution including a lanthanide complex (a first mixed solution production step).

The first mixed solution was mixed with the solution including the LiYbF$_4$:Tm$^{3+}$/LiGdF$_4$/LiGdF$_4$:Yb$^{3+}$,Er$^{3+}$/LiYF$_4$:Nd$^{3+}$,Yb$^{3+}$/LiGdF$_4$ nanoparticles synthesized in Embodiment 5, to produce a second mixed solution.

10 ml of a methanol solution including 2.5 mmol of lithium hydroxide and 4 mmol of ammonium fluoride was produced (a third mixed solution production step) and then was mixed with the mixed solution including the lanthanide complex (a reaction solution production step).

After sufficiently mixed, methanol was removed and then heat treatment was performed in an inert gas atmosphere. In this case, when the temperature of heat treatment was lower than 200° C., single-phase tetragonal nanocrystals might not be completely formed and thus the phosphor might not exhibit intense luminescence. When the temperature of heat treatment was higher than 370° C., aggregation of particles due to overreaction might lead to very large and non-uniform particle diameters and thus a reduction in brightness may be caused. Therefore, the temperature of heat treatment might be 200° C. to 370° C. and the time of heat treatment might be 10 minutes to 4 hours (a nanoparticle formation step). After the heat treatment process was finished and a cooling process was performed to room temperature, a colloidal nanophosphor having a particle diameter of 1 nm to 70 nm was obtained. The nanophosphor obtained as described above was washed with acetone or ethanol and then was dispersed and stored in a non-polar solvent such as hexane, toluene, or chloroform.

Figure 7:
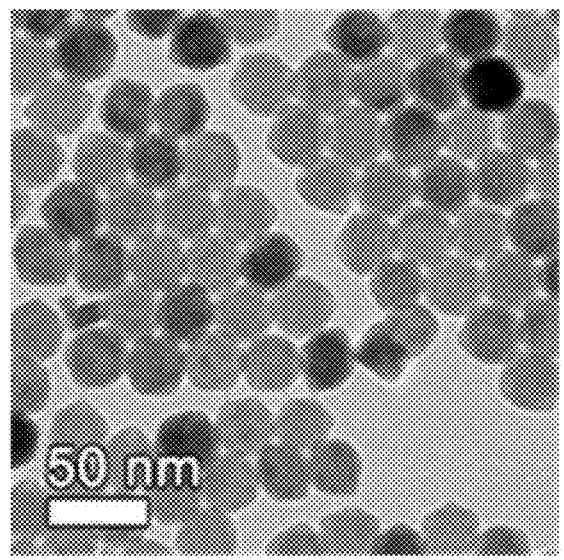
FIG. 7 is a TEM image of core/shell/shell/shell/shell/shell nanoparticles according to an embodiment of the present invention.

FIG. 7 is a TEM image of the core/shell/shell/shell/shell/shell upconversion nanophosphor synthesized in Embodiment 6 of the present invention, and shows that a particle diameter is additionally increased due to a shell formed around the core/shell/shell/shell/shell structure.

<Embodiment 7> Synthesis of Core/Shell/Shell/Shell/Shell/Shell/Shell Upconversion Nanophosphor A core/shell/shell/shell/shell/shell/shell nanophosphor including cores using the LiYbF$_4$:Tm$^{3+}$/LiGdF$_4$/LiGdF$_4$:Yb$^{3+}$,Er$^{3+}$/LiYF$_4$:Nd$^{3+}$,Yb$^{3+}$/LiGdF$_4$/LiErF$_4$:Tm$^{3+}$ nanoparticles synthesized in Embodiment 6, and further including a LiGdF$_4$ compound was synthesized. For convenience, the core/shell/shell/shell/shell/shell/shell structure may be understood as a core/first shell/second shell/third shell/fourth shell/fifth shell/sixth shell structure.

2 mmol of gadolinium chloride hydrate (GdCl$_3$.6H$_2$O) was mixed with a solution including oleic acid and 1-octadecene and heat treatment was performed at 150° C. for 30 minutes to produce a mixed solution including a lanthanide complex (a first mixed solution production step).

The first mixed solution was mixed with the solution including the LiYbF$_4$:Tm$^{3+}$/LiGdF$_4$/LiGdF$_4$:Yb$^{3+}$,Er$^{3+}$/LiYF$_4$:Nd$^{3+}$,Yb$^{3+}$/LiGdF$_4$/LiErF$_4$:Tm$^{3+}$ nanoparticles synthesized in Embodiment 6, to produce a second mixed solution.

20 ml of a methanol solution including 5 mmol of lithium hydroxide and 8 mmol of ammonium fluoride was produced (a third mixed solution production step) and then was mixed with the mixed solution including the lanthanide complex (a reaction solution production step).

After sufficiently mixed, methanol was removed and then heat treatment was performed in an inert gas atmosphere. In this case, when the temperature of heat treatment was lower than 200° C., single-phase tetragonal nanocrystals might not be completely formed and thus the phosphor might not exhibit intense luminescence. When the temperature of heat treatment was higher than 370° C., aggregation of particles due to overreaction might lead to very large and non-uniform particle diameters and thus a reduction in brightness may be caused. Therefore, the temperature of heat treatment might be 200° C. to 370° C. and the time of heat treatment might be 10 minutes to 4 hours (a nanoparticle formation step). After the heat treatment process was finished and a cooling process was performed to room temperature, a colloidal nanophosphor having a particle diameter of 1 nm to 80 nm was obtained. The nanophosphor obtained as described above was washed with acetone or ethanol and then was dispersed and stored in a non-polar solvent such as hexane, toluene, or chloroform.

Figure 8:
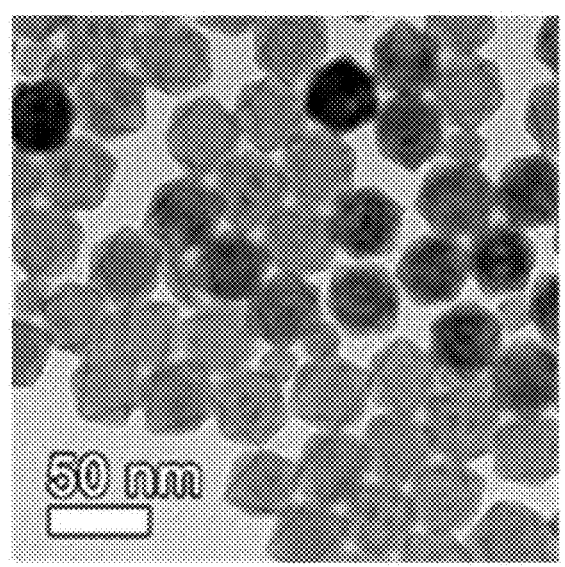
FIG. 8 is a TEM image of core/shell/shell/shell/shell/shell/shell nanoparticles according to an embodiment of the present invention.
Figure 9:
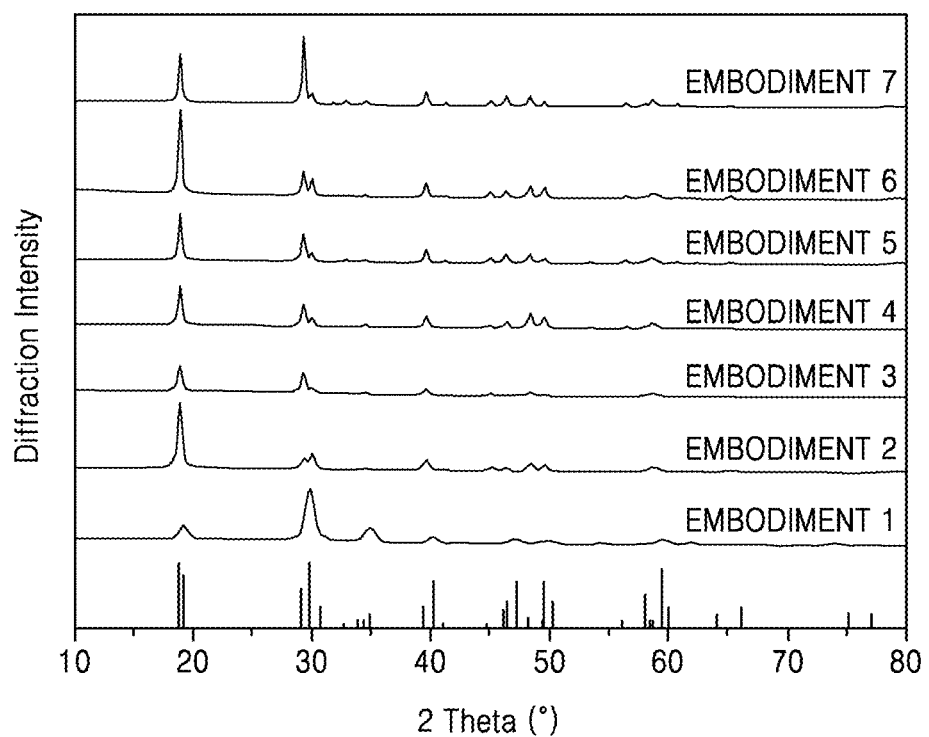
FIG. 9 shows X-ray diffraction patterns of core to core/shell/shell/shell/shell/shell/shell nanoparticles according to embodiments of the present invention.
Figure 10:
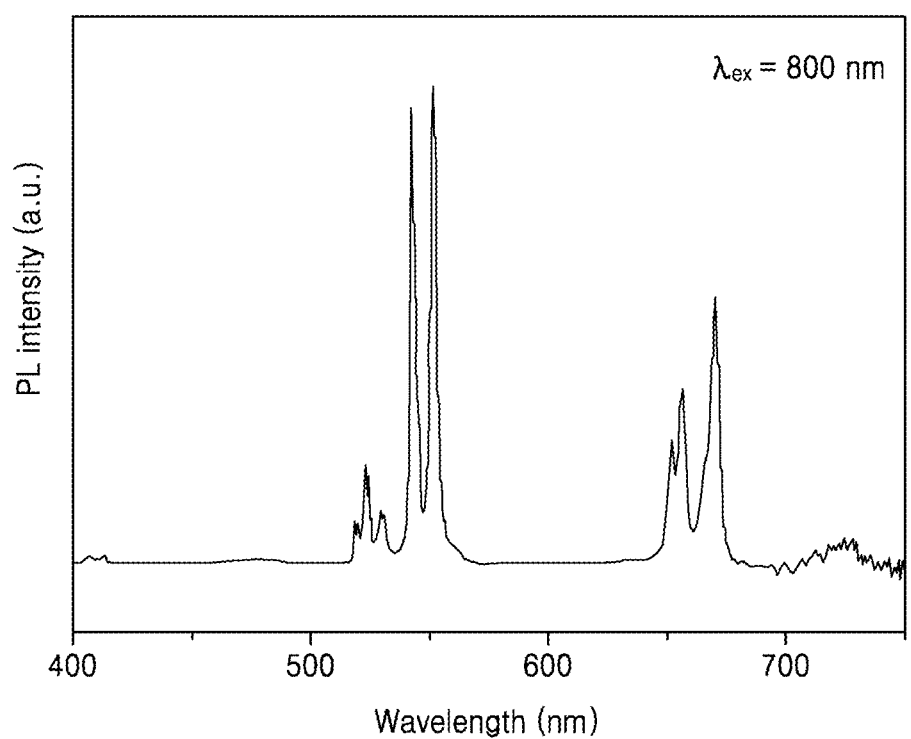
FIG. 10 shows a photoluminescence (PL) spectrum of core/shell/shell/shell/shell/shell/shell nanoparticles according to an embodiment of the present invention under a 800 nm near-infrared (NIR) excitation condition.
Figure 11:
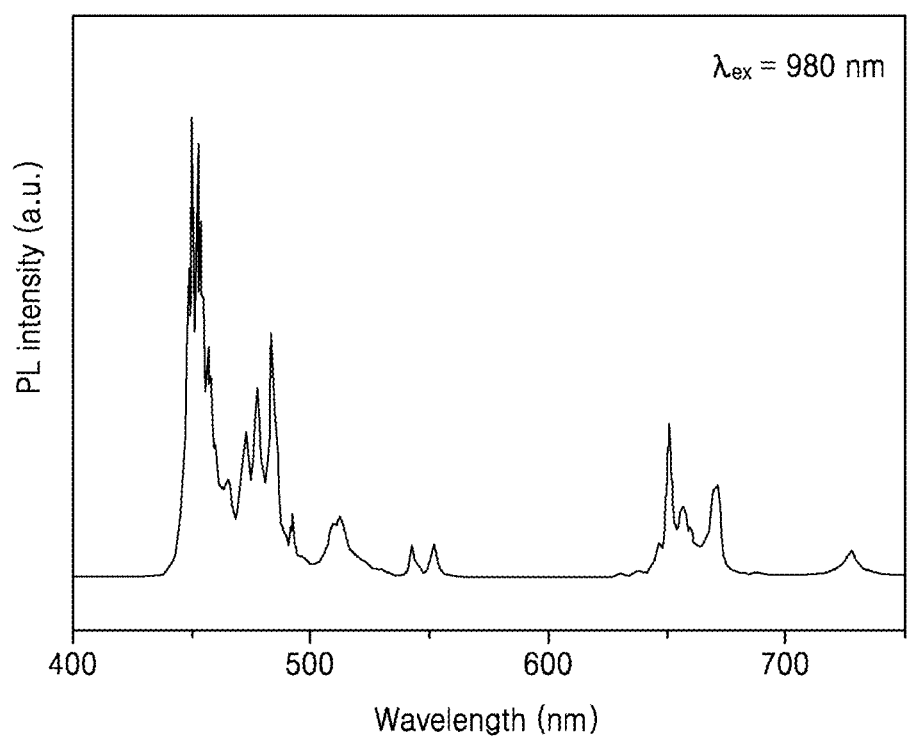
FIG. 11 shows a PL spectrum of core/shell/shell/shell/shell/shell/shell nanoparticles according to an embodiment of the present invention under a 980 nm NIR excitation condition.
Figure 12:
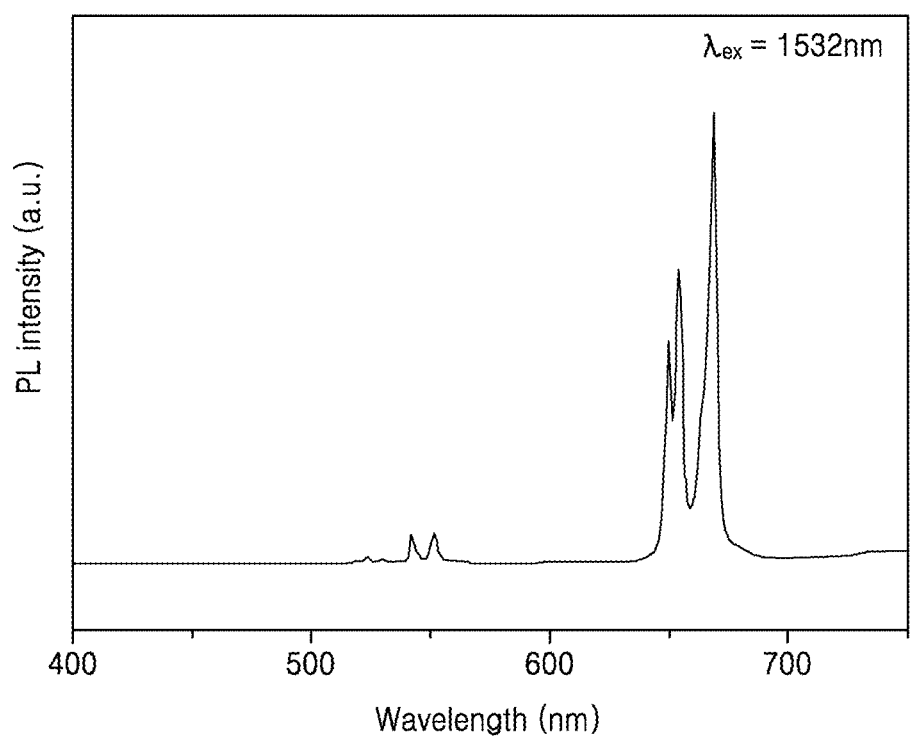
FIG. 12 shows a PL spectrum of core/shell/shell/shell/shell/shell/shell nanoparticles according to an embodiment of the present invention under a 1532 nm NIR excitation condition.
Figure 13:
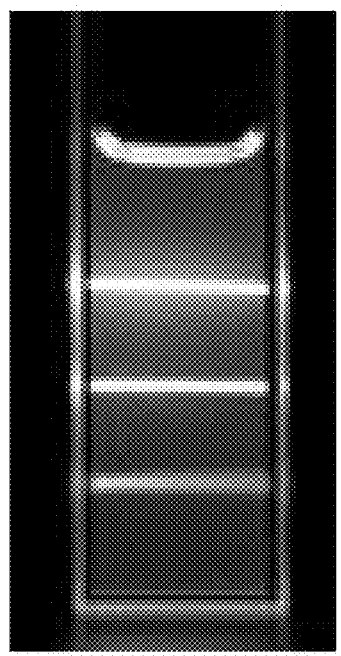
FIG. 13 is a PL image of core/shell/shell/shell/shell/shell/shell nanoparticles according to an embodiment of the present invention under 800 nm, 980 nm, and 1532 nm NIR excitation conditions.

FIG. 8 is a TEM image of the core/shell/shell/shell/shell/shell/shell upconversion nanophosphor synthesized in Embodiment 7 of the present invention, and shows that a particle diameter is additionally increased due to a shell formed around the core/shell/shell/shell/shell/shell structure. X-ray diffraction patterns of FIG. 9 show that each of the upconversion nanophosphors synthesized in Embodiments 1 to 7 exhibits a single tetragonal phase without impurities. Photoluminescence (PL) spectra of FIGS. 10 to 12 show that the core/shell/shell/shell/shell/shell/shell upconversion nanophosphor synthesized in Embodiment 7 emits green light under 800 nm NIR excitation, emits blue light under 980 nm NIR excitation, and emits red light under 1532 nm NIR excitation. A PL image of FIG. 13 shows that the core/shell/shell/shell/shell/shell/shell upconversion nanophosphor synthesized in Embodiment 7 may simultaneously emit light of blue, green, and red, and a chromaticity diagram of FIG. 14 shows that the core/shell/shell/shell/shell/shell/shell upconversion nanophosphor emits light of various colors such as blue, blue-green, green, yellow, purple, and red when wavelengths of NIR excitation light are combined.

Figure 14:
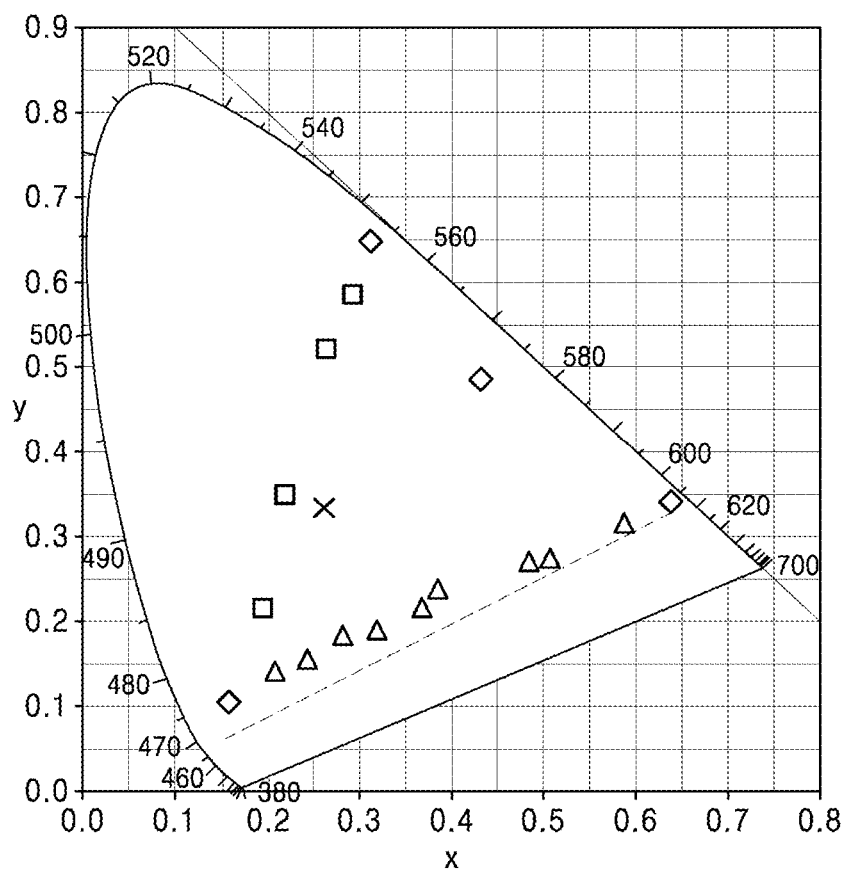
FIG. 14 shows color coordinates of core/shell/shell/shell/shell/shell/shell nanoparticles according to an embodiment of the present invention under various NIR excitation conditions.

In FIG. 14, x indicates the color coordinates showing the white light emission from the core/multishell tetragonal upconversion nanophosphor. ◇ indicates the color coordinates of green, blue, and red light emitted from the core/multishell tetragonal upconversion nanophosphor under single wavelength NIR light excitation such as 800, 980, and 1532 nm excitations. ◇ also indicates the color coordinates of the upconversion luminescence color of the core/multishell tetragonal upconversion nanophosphor between green and red chromaticity regions. □ indicates the color coordinates of the upconversion luminescence color of the core/multishell tetragonal upconversion nanophosphor between blue and green chromaticity regions. △ indicates the color coordinates of the upconversion luminescence color of the core/multishell tetragonal upconversion nanophosphor between blue and red regions in the chromaticity diagram.

<Embodiment 8> Synthesis of Core/Shell/Shell Blue/Red-Emitting Upconversion Nanophosphor A core/shell/shell nanophosphor including cores using the $LiYb_{0.99}F_4:Tm^{3+}_{0.01}/LiGdF_4$ nanoparticles synthesized in Embodiment 2, and further including a $LiErF_4:Tm^{3+}$ compound was synthesized. For convenience, the core/shell/shell structure may be understood as a core/first shell/second shell structure.

0.997 mmol of erbium chloride hydrate ($ErCl_3.6H_2O$) and 0.003 mmol of thulium chloride hydrate ($TmCl_3.6H_2O$) were mixed with a solution including oleic acid and 1-octadecene and heat treatment was performed at 150° C. for 30 minutes to produce a mixed solution including a lanthanide complex (a first mixed solution production step).

The first mixed solution was mixed with the solution including the $LiYbF_4:Tm^{3+}/LiGdF_4$ nanoparticles synthesized in Embodiment 2, to produce a second mixed solution.

10 ml of a methanol solution including 2.5 mmol of lithium hydroxide and 4 mmol of ammonium fluoride was produced (a third mixed solution production step) and then was mixed with the mixed solution including the lanthanide complex (a reaction solution production step).

After sufficiently mixed, methanol was removed and then heat treatment was performed in an inert gas atmosphere. In this case, when the temperature of heat treatment was lower than 200° C., single-phase tetragonal nanocrystals might not be completely formed and thus the phosphor might not exhibit intense luminescence. When the temperature of heat treatment was higher than 370° C., aggregation of particles due to overreaction might lead to very large and non-uniform particle diameters and thus a reduction in brightness may be caused. Therefore, the temperature of heat treatment might be 200° C. to 370° C. and the time of heat treatment might be 10 minutes to 4 hours (a nanoparticle formation step). After the heat treatment process was finished and a cooling process was performed to room temperature, a colloidal nanophosphor having a particle diameter of 1 nm to 40 nm was obtained. The nanophosphor obtained as described above was washed with acetone or ethanol and then was dispersed and stored in a non-polar solvent such as hexane, toluene, or chloroform.

Figure 15:
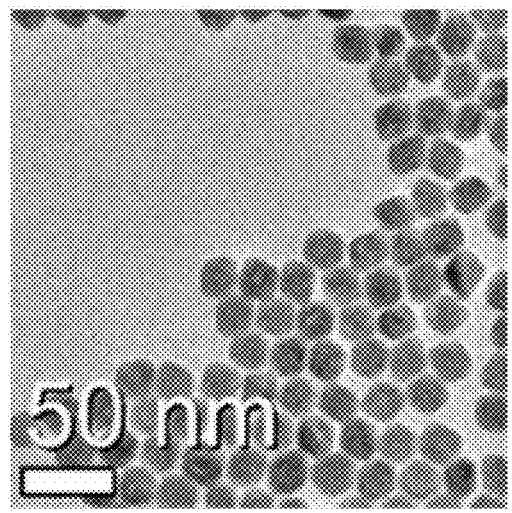
FIG. 15 is a TEM image of core/shell/shell nanoparticles according to an embodiment of the present invention.

FIG. 15 is a TEM image of the core/shell/shell blue/red-emitting upconversion nanophosphor synthesized in Embodiment 8 of the present invention, and shows that a particle diameter is additionally increased due to a shell formed around the core/shell structure.

<Embodiment 9> Synthesis of Core/Shell/Shell/Shell Blue/Red-Emitting Upconversion Nanophosphor A core/shell/shell/shell nanophosphor including cores using the $LiYb_{0.99}F_4:Tm^{3+}_{0.01}/LiGdF_4/LiErF_4:Tm^{3+}$ nanoparticles synthesized in Embodiment 8, and further including a $LiGdF_4$ compound was synthesized. For convenience, the core/shell/shell/shell structure may be understood as a core/first shell/second shell/third shell structure.

2 mmol of gadolinium chloride hydrate ($GdCl_3.6H_2O$) was mixed with a solution including oleic acid and 1-octadecene and heat treatment was performed at 150° C. for 30 minutes to produce a mixed solution including a lanthanide complex (a first mixed solution production step).

The first mixed solution was mixed with the solution including the $LiYb_{0.99}F_4:Tm^{3+}_{0.01}/LiGdF_4/LiErF_4:Tm^{3+}$ nanoparticles synthesized in Embodiment 8, to produce a second mixed solution.

20 ml of a methanol solution including 5 mmol of lithium hydroxide and 8 mmol of ammonium fluoride was produced (a third mixed solution production step) and then was mixed with the mixed solution including the lanthanide complex (a reaction solution production step).

After sufficiently mixed, methanol was removed and then heat treatment was performed in an inert gas atmosphere. In this case, when the temperature of heat treatment was lower than 200° C., single-phase tetragonal nanocrystals might not be completely formed and thus the phosphor might not exhibit intense luminescence. When the temperature of heat treatment was higher than 370° C., aggregation of particles due to overreaction might lead to very large and non-uniform particle diameters and thus a reduction in brightness may be caused. Therefore, the temperature of heat treatment might be 200° C. to 370° C. and the time of heat treatment might be 10 minutes to 4 hours (a nanoparticle formation step). After the heat treatment process was finished and a cooling process was performed to room temperature, a colloidal nanophosphor having a particle diameter of 1 nm to 50 nm was obtained. The nanophosphor obtained as described above was washed with acetone or ethanol and then was dispersed and stored in a non-polar solvent such as hexane, toluene, or chloroform.

Figure 16:
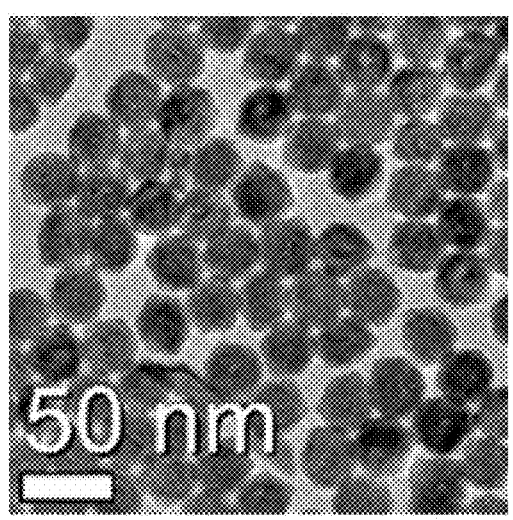
FIG. 16 is a TEM image of core/shell/shell/shell nanoparticles according to an embodiment of the present invention.

FIG. 16 is a TEM image of the core/shell/shell/shell upconversion nanophosphor synthesized in Embodiment 9 of the present invention, and shows that a particle diameter is additionally increased due to a shell formed around the core/shell/shell structure.

<Embodiment 10> Synthesis of
Core/Shell/Shell/Shell/Shell
Blue/Red/Green-Emitting Upconversion
Nanophosphor A core/shell/shell/shell/shell nanophosphor including cores using the $LiYb_{0.99}F_4:Tm^{3+}_{0.01}/LiGdF_4/LiErF_4:Tm^{3+}/LiGdF_4$ nanoparticles synthesized in Embodiment 9, and further including a $LiGdF_4:Yb^{3+},Er^{3+}$ compound was synthesized. For convenience, the core/shell/shell/shell/shell structure may be understood as a core/first shell/second shell/third shell/fourth shell structure.

0.80 mmol of gadolinium chloride hydrate ($GdCl_3.6H_2O$), 0.18 mmol of ytterbium chloride hydrate ($YbCl_3.6H_2O$), and 0.02 mmol of erbium chloride hydrate ($ErCl_3.6H_2O$) were mixed with a solution including oleic acid and 1-octadecene and heat treatment was performed at 150° C. for 30 minutes to produce a mixed solution including a lanthanide complex (a first mixed solution production step).

The first mixed solution was mixed with the solution including the $LiYb_{0.99}F_4:TM^{3+}_{0.01}/LiGdF_4/LiErF_4:Tm^{3+}/LiGdF_4$ nanoparticles synthesized in Embodiment 9, to produce a second mixed solution.

10 ml of a methanol solution including 2.5 mmol of lithium hydroxide and 4 mmol of ammonium fluoride was produced (a third mixed solution production step) and then was mixed with the mixed solution including the lanthanide complex (a reaction solution production step).

After sufficiently mixed, methanol was removed and then heat treatment was performed in an inert gas atmosphere. In this case, when the temperature of heat treatment was lower than 200° C., single-phase tetragonal nanocrystals might not be completely formed and thus the phosphor might not exhibit intense luminescence. When the temperature of heat treatment was higher than 370° C., aggregation of particles due to overreaction might lead to very large and non-uniform particle diameters and thus a reduction in brightness may be caused. Therefore, the temperature of heat treatment might be 200° C. to 370° C. and the time of heat treatment might be 10 minutes to 4 hours (a nanoparticle formation step). After the heat treatment process was finished and a cooling process was performed to room temperature, a colloidal nanophosphor having a particle diameter of 1 nm to 60 nm was obtained. The nanophosphor obtained as described above was washed with acetone or ethanol and then was dispersed and stored in a non-polar solvent such as hexane, toluene, or chloroform.

Figure 17:
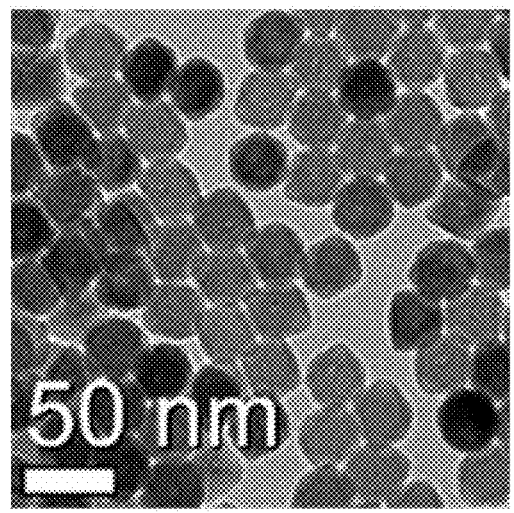
FIG. 17 is a TEM image of core/shell/shell/shell/shell nanoparticles according to an embodiment of the present invention.

FIG. 17 is a TEM image of the core/shell/shell/shell/shell upconversion nanophosphor synthesized in Embodiment 10 of the present invention, and shows that a particle diameter is additionally increased due to a shell formed around the core/shell/shell/shell structure.

<Embodiment 11> Synthesis of
Core/Shell/Shell/Shell/Shell/Shell
Blue/Red/Green-Emitting Upconversion
Nanophosphor A core/shell/shell/shell/shell/shell nanophosphor including cores using the $LiYb_{0.99}F_4:Tm^{3+}_{0.01}/LiGdF_4/LiErF_4:Tm^{3+}/LiGdF_4/LiGdF_4:Yb^{3+},Er^{3+}$ nanoparticles synthesized in Embodiment 10, and further including a $LiYF_4:Nd^{3+},Yb^{3+}$ compound was synthesized. For convenience, the core/shell/shell/shell/shell/shell structure may be understood as a core/first shell/second shell/third shell/fourth shell/fifth shell.

1.1 mmol of yttrium chloride hydrate ($YCl_3.6H_2O$), 0.8 mmol of neodymium chloride hydrate ($NdCl_3.6H_2O$), and 0.1 mmol of ytterbium chloride hydrate ($YbCl_3.6H_2O$) were mixed with a solution including oleic acid and 1-octadecene and heat treatment was performed at 150° C. for 30 minutes to produce a mixed solution including a lanthanide complex (a first mixed solution production step).

The first mixed solution was mixed with the solution including the $LiYb_{0.99}F_4:Tm^{3+}_{0.01}/LiGdF_4/LiErF_4:Tm^{3+}/LiGdF_4/LiGdF_4:Yb^{3+},Er^{3+}$ nanoparticles synthesized in Embodiment 10, to produce a second mixed solution.

20 ml of a methanol solution including 5 mmol of lithium hydroxide and 8 mmol of ammonium fluoride was produced (a third mixed solution production step) and then was mixed with the mixed solution including the lanthanide complex (a reaction solution production step).

After sufficiently mixed, methanol was removed and then heat treatment was performed in an inert gas atmosphere. In this case, when the temperature of heat treatment was lower than 200° C., single-phase tetragonal nanocrystals might not be completely formed and thus the phosphor might not exhibit intense luminescence. When the temperature of heat treatment was higher than 370° C., aggregation of particles due to overreaction might lead to very large and non-uniform particle diameters and thus a reduction in brightness may be caused. Therefore, the temperature of heat treatment might be 200° C. to 370° C. and the time of heat treatment might be 10 minutes to 4 hours (a nanoparticle formation step). After the heat treatment process was finished and a cooling process was performed to room temperature, a colloidal nanophosphor having a particle diameter of 1 nm to 70 nm was obtained. The nanophosphor obtained as described above was washed with acetone or ethanol and then was dispersed and stored in a non-polar solvent such as hexane, toluene, or chloroform.

Figure 18:
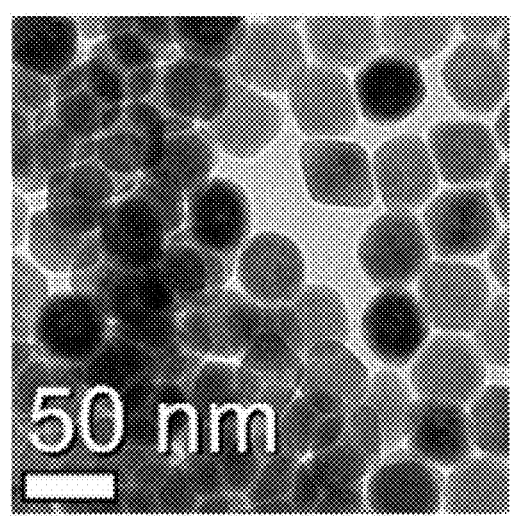
FIG. 18 is a TEM image of core/shell/shell/shell/shell/shell nanoparticles according to an embodiment of the present invention.

FIG. 18 is a TEM image of the core/shell/shell/shell/shell/shell upconversion nanophosphor synthesized in Embodiment 11 of the present invention, and shows that a particle diameter is additionally increased due to a shell formed around the core/shell/shell/shell/shell structure.

<Embodiment 12> Synthesis of
Core/Shell/Shell/Shell/Shell/Shell/Shell
Blue/Red/Green-Emitting Upconversion
Nanophosphor A core/shell/shell/shell/shell/shell/shell nanophosphor including cores using the $LiYb_{0.99}F_4:TM^{3+}_{0.01}/LiGdF_4/LiErF_4:Tm^{3+}/LiGdF_4/LiGdF_4:Yb^{3+},Er^{3+}/LiYF_4:Nd^{3+},Yb^{3+}$ nanoparticles synthesized in Embodiment 11, and further including a $LiGdF_4$ compound was synthesized. For convenience, the core/shell/shell/shell/shell/shell/shell structure may be understood as a core/first shell/second shell/third shell/fourth shell/fifth shell/sixth shell structure.

2 mmol of gadolinium chloride hydrate ($GdCl_3.6H_2O$) was mixed with a solution including oleic acid and 1-octadecene and heat treatment was performed at 150° C. for 30 minutes to produce a mixed solution including a lanthanide complex (a first mixed solution production step).

The first mixed solution was mixed with the solution including the $LiYb_{0.99}F_4:TM^{3+}_{0.01}/LiGdF_4/LiErF_4:Tm^{3+}/LiGdF_4/LiGdF_4:Yb^{3+},Er^{3+}/LiYF_4:Nd^{3+},Yb^{3+}$ nanoparticles synthesized in Embodiment 11, to produce a second mixed solution.

20 ml of a methanol solution including 5 mmol of lithium hydroxide and 8 mmol of ammonium fluoride was produced (a third mixed solution production step) and then was mixed with the mixed solution including the lanthanide complex (a reaction solution production step).

After sufficiently mixed, methanol was removed and then heat treatment was performed in an inert gas atmosphere. In this case, when the temperature of heat treatment was lower than 200° C., single-phase tetragonal nanocrystals might not be completely formed and thus the phosphor might not exhibit intense luminescence. When the temperature of heat treatment was higher than 370° C., aggregation of particles due to overreaction might lead to very large and non-uniform particle diameters and thus a reduction in brightness may be caused. Therefore, the temperature of heat treatment might be 200° C. to 370° C. and the time of heat treatment might be 10 minutes to 4 hours (a nanoparticle formation step). After the heat treatment process was finished and a cooling process was performed to room temperature, a colloidal nanophosphor having a particle diameter of 1 nm to 80 nm was obtained. The nanophosphor obtained as described above was washed with acetone or ethanol and then was dispersed and stored in a non-polar solvent such as hexane, toluene, or chloroform.

Figure 19:
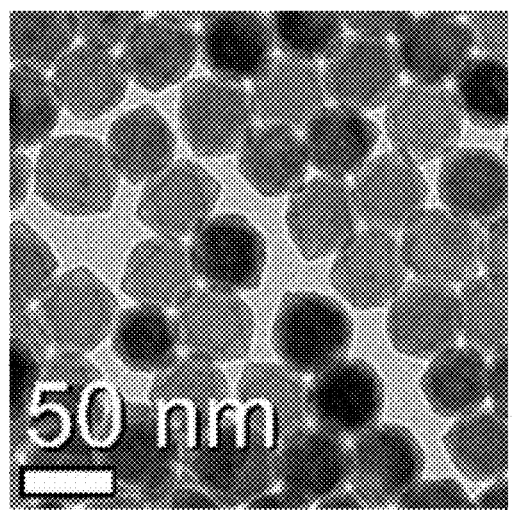
FIG. 19 is a TEM image of core/shell/shell/shell/shell/shell nanoparticles according to an embodiment of the present invention.
Figure 20:
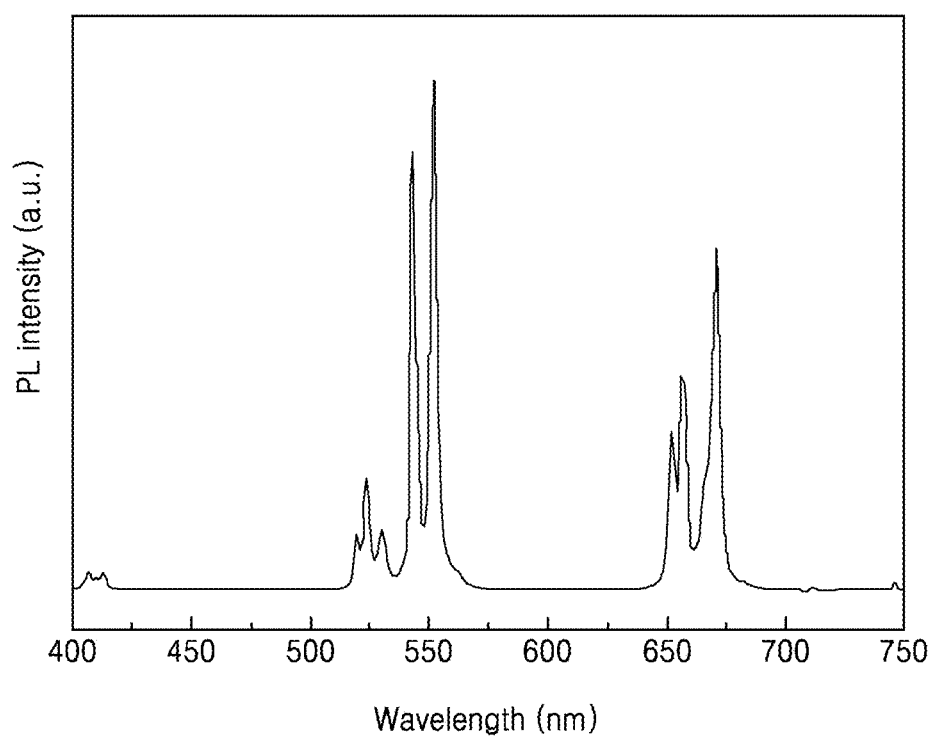
FIG. 20 shows a PL spectrum of core/shell/shell/shell/shell/shell nanoparticles according to an embodiment of the present invention under an 800 nm NIR excitation condition.
Figure 21:
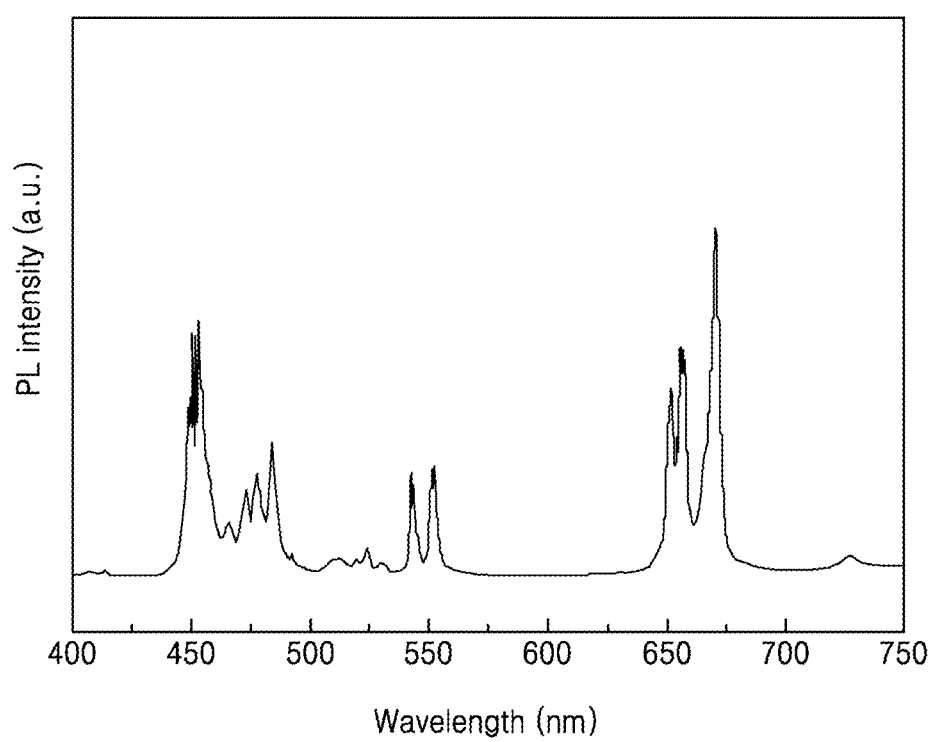
FIG. 21 shows a PL spectrum of core/shell/shell/shell/shell/shell nanoparticles according to an embodiment of the present invention under a 980 nm NIR excitation condition.
Figure 22:
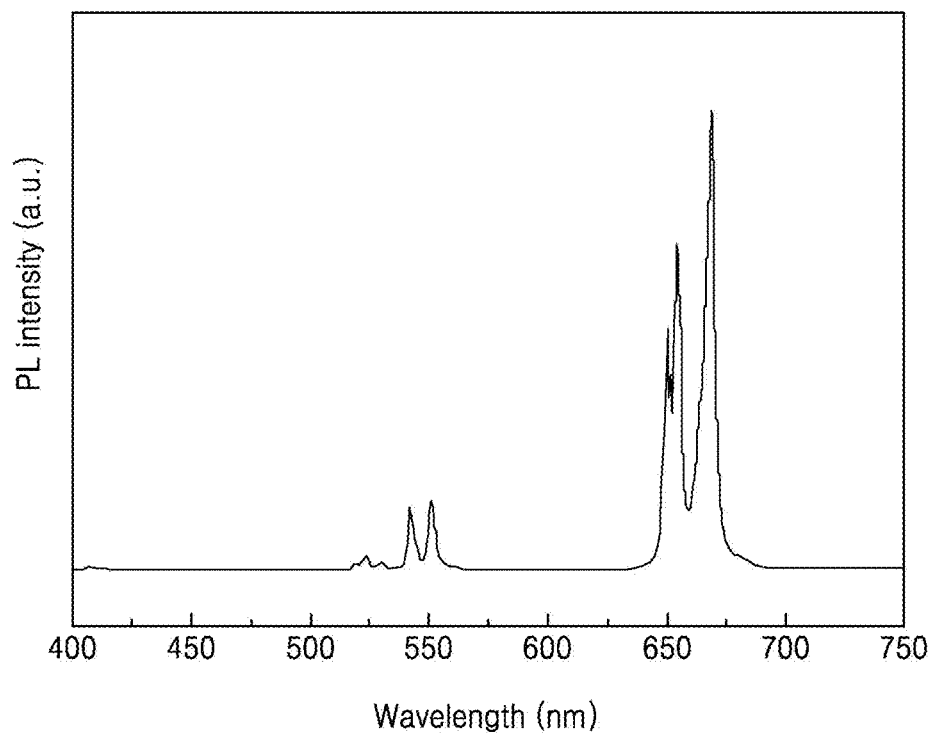
FIG. 22 shows a PL spectrum of core/shell/shell/shell/shell/shell nanoparticles according to an embodiment of the present invention under a 1532 nm NIR excitation condition.

FIG. 19 is a TEM image of the core/shell/shell/shell/shell/shell/shell upconversion nanophosphor synthesized in Embodiment 12 of the present invention, and shows that a particle diameter is additionally increased due to a shell formed around the core/shell/shell/shell/shell/shell structure. PL spectra of FIGS. 20 to 22 show that the core/shell/shell/shell/shell/shell/shell upconversion nanophosphor synthesized in Embodiment 12 may also emit all of green light, blue light, and red light depending on a wavelength of an excitation laser beam.

<Embodiment 13> Synthesis of Red-Emitting Core Upconversion Nanophosphor 0.997 mmol of erbium chloride hydrate ($ErCl_3.6H_2O$), 0.003 mmol of thulium chloride hydrate ($TmCl_3.6H_2O$), and 3.1 mmol of sodium oleate ($C_{18}H_{33}O_2Na$) were weighed, a certain amount of a mixed solvent of water, ethanol, and hexane was added, and then heat treatment was performed at 70° C. to form a lanthanide complex (a complex formation step). The complex was mixed with a solution including oleic acid and 1-octadecene and heat treatment was performed at 150° C. for 30 minutes to produce a mixed solution including the lanthanide complex (a first mixed solution production step).

10 ml of a methanol solution including 2.5 mmol of lithium hydroxide and 4 mmol of ammonium fluoride was produced (a third mixed solution production step) and then was mixed with the mixed solution including the lanthanide complex (a reaction solution production step).

After sufficiently mixed, methanol was removed and then heat treatment was performed in an inert gas atmosphere. In this case, when the temperature of heat treatment was lower than 200° C., single-phase tetragonal nanocrystals might not be completely formed and thus the phosphor might not exhibit intense luminescence. When the temperature of heat treatment was higher than 370° C., aggregation of particles due to overreaction might lead to very large and non-uniform particle diameters and thus a reduction in brightness may be caused. Therefore, the temperature of heat treatment might be 200° C. to 370° C. and the time of heat treatment might be 10 minutes to 4 hours (a nanoparticle formation step). After the heat treatment process was finished and a cooling process was performed to room temperature, a colloidal nanophosphor having a particle diameter of 1 nm to 10 nm was obtained. The nanophosphor obtained as described above was washed with acetone or ethanol and then was dispersed and stored in a non-polar solvent such as hexane, toluene, or chloroform.

Figure 23:
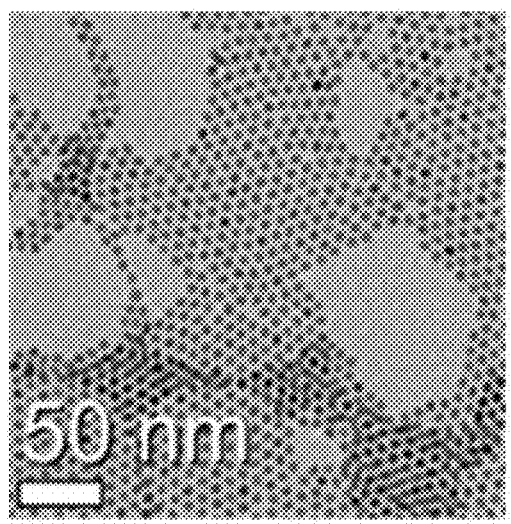
FIG. 23 is a TEM image of core nanoparticles according to an embodiment of the present invention.

FIG. 23 is a TEM image of the red-emitting core upconversion nanophosphor synthesized in Embodiment 13 of the present invention, and shows that a core nanophosphor having a uniform diameter within 10 nm is synthesized.

<Embodiment 14> Synthesis of Core/Shell Red-Emitting Upconversion Nanophosphor by Forming Fluoride Shell A core/shell nanophosphor including cores using the $LiEr_{0.997}F_4:Tm^{3+}_{0.003}$ nanoparticles synthesized in Embodiment 13, and further including a fluoride compound was synthesized.

2 mmol of gadolinium chloride hydrate ($GdCl_3.6H_2O$) was mixed with a solution including oleic acid and 1-octadecene and heat treatment was performed at 150° C. for 30 minutes to produce a mixed solution including a lanthanide complex (a first mixed solution production step).

The first mixed solution was mixed with the solution including the $LiErF_4:Tm^{3+}$ nanoparticles synthesized in Embodiment 13, to produce a second mixed solution.

20 ml of a methanol solution including 5 mmol of lithium hydroxide and 8 mmol of ammonium fluoride was produced (a third mixed solution production step) and then was mixed with the mixed solution including the lanthanide complex (a reaction solution production step).

After sufficiently mixed, methanol was removed and then heat treatment was performed in an inert gas atmosphere. In this case, when the temperature of heat treatment was lower than 200° C., single-phase tetragonal nanocrystals might not be completely formed and thus the phosphor might not exhibit intense luminescence. When the temperature of heat treatment was higher than 370° C., aggregation of particles due to overreaction might lead to very large and non-uniform particle diameters and thus a reduction in brightness may be caused. Therefore, the temperature of heat treatment might be 200° C. to 370° C. and the time of heat treatment might be 10 minutes to 4 hours (a nanoparticle formation step). After the heat treatment process was finished and a cooling process was performed to room temperature, a colloidal nanophosphor having a particle diameter of 1 nm to 30 nm was obtained. The nanophosphor obtained as described above was washed with acetone or ethanol and then was dispersed and stored in a non-polar solvent such as hexane, toluene, or chloroform.

Figure 24:
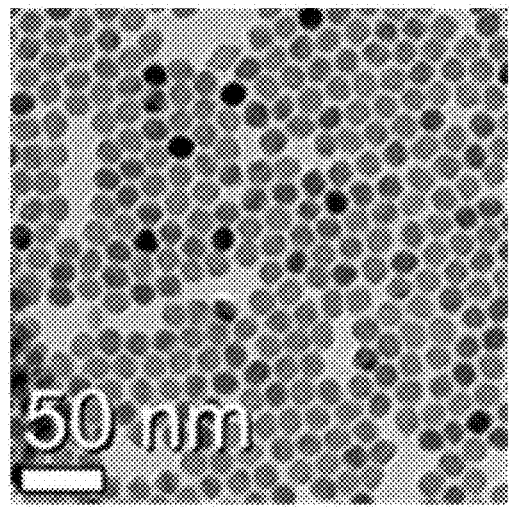
FIG. 24 is a TEM image of core/shell nanoparticles according to an embodiment of the present invention.

FIG. 24 is a TEM image of the core/shell upconversion nanophosphor synthesized in Embodiment 14, and shows that shows that a particle diameter of the nanophosphor is increased due to formation of a shell.

<Embodiment 15> Synthesis of Core/Shell/Shell Red/Green-Emitting Upconversion Nanophosphor A core/shell/shell nanophosphor including cores using the $LiErF_4:Tm^{3+}/LiGdF_4$ nanoparticles synthesized in Embodiment 14, and further including a $LiGdF_4:Yb^{3+},Er^{3+}$ compound was synthesized. For convenience, the core/shell/shell structure may be understood as a core/first shell/second shell structure.

0.80 mmol of gadolinium chloride hydrate ($GdCl_3.6H_2O$), 0.18 mmol of ytterbium chloride hydrate ($YbCl_3.6H_2O$), and 0.02 mmol of erbium chloride hydrate ($ErCl_3.6H_2O$) were mixed with a solution including oleic acid and 1-octadecene and heat treatment was performed at 150° C. for 30 minutes to produce a mixed solution including a lanthanide complex (a first mixed solution production step).

The first mixed solution was mixed with the solution including the LiErF$_4$:Tm$^{3+}$/LiGdF$_4$ nanoparticles synthesized in Embodiment 14, to produce a second mixed solution.

10 ml of a methanol solution including 2.5 mmol of lithium hydroxide and 4 mmol of ammonium fluoride was produced (a third mixed solution production step) and then was mixed with the mixed solution including the lanthanide complex (a reaction solution production step).

After sufficiently mixed, methanol was removed and then heat treatment was performed in an inert gas atmosphere. In this case, when the temperature of heat treatment was lower than 200° C., single-phase tetragonal nanocrystals might not be completely formed and thus the phosphor might not exhibit intense luminescence. When the temperature of heat treatment was higher than 370° C., aggregation of particles due to overreaction might lead to very large and non-uniform particle diameters and thus a reduction in brightness may be caused. Therefore, the temperature of heat treatment might be 200° C. to 370° C. and the time of heat treatment might be 10 minutes to 4 hours (a nanoparticle formation step). After the heat treatment process was finished and a cooling process was performed to room temperature, a colloidal nanophosphor having a particle diameter of 1 nm to 40 nm was obtained. The nanophosphor obtained as described above was washed with acetone or ethanol and then was dispersed and stored in a non-polar solvent such as hexane, toluene, or chloroform.

Figure 25:
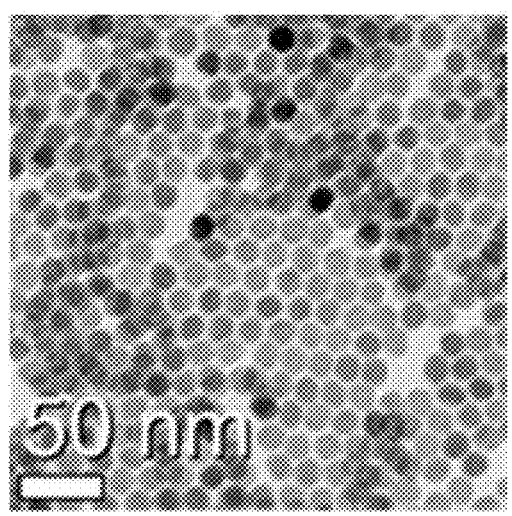
FIG. 25 is a TEM image of core/shell/shell nanoparticles according to an embodiment of the present invention.

FIG. 25 is a TEM image of the core/shell/shell red/green-emitting upconversion nanophosphor synthesized in Embodiment 15 of the present invention, and shows that a particle diameter is additionally increased due to a shell formed around the core/shell structure.

<Embodiment 16> Synthesis of Core/Shell/Shell/Shell Red/Green-Emitting Upconversion Nanophosphor A core/shell/shell/shell nanophosphor including cores using the LiErF$_4$:Tm$^{3+}$/LiGdF$_4$/LiGdF$_4$:Yb$^{3+}$,Er$^{3+}$ nanoparticles synthesized in Embodiment 15, and further including a LiYF$_4$:Nd$^{3+}$,Yb$^{3+}$ compound was synthesized. For convenience, the core/shell/shell/shell structure may be understood as a core/first shell/second shell/third shell structure.

1.1 mmol of yttrium chloride hydrate (YCl$_3$.6H$_2$O), 0.8 mmol of neodymium chloride hydrate (NdCl$_3$.6H$_2$O), and 0.1 mmol of ytterbium chloride hydrate (YbCl$_3$.6H$_2$O) were mixed with a solution including oleic acid and 1-octadecene and heat treatment was performed at 150° C. for 30 minutes to produce a mixed solution including a lanthanide complex (a first mixed solution production step).

The first mixed solution was mixed with the solution including the LiErF$_4$:Tm$^{3+}$/LiGdF$_4$/LiGdF$_4$:Yb$^{3+}$,Er$^{3+}$ nanoparticles synthesized in Embodiment 15, to produce a second mixed solution.

20 ml of a methanol solution including 5 mmol of lithium hydroxide and 8 mmol of ammonium fluoride was produced (a third mixed solution production step) and then was mixed with the mixed solution including the lanthanide complex (a reaction solution production step).

After sufficiently mixed, methanol was removed and then heat treatment was performed in an inert gas atmosphere. In this case, when the temperature of heat treatment was lower than 200° C., single-phase tetragonal nanocrystals might not be completely formed and thus the phosphor might not exhibit intense luminescence. When the temperature of heat treatment was higher than 370° C., aggregation of particles due to overreaction might lead to very large and non-uniform particle diameters and thus a reduction in brightness may be caused. Therefore, the temperature of heat treatment might be 200° C. to 370° C. and the time of heat treatment might be 10 minutes to 4 hours (a nanoparticle formation step). After the heat treatment process was finished and a cooling process was performed to room temperature, a colloidal nanophosphor having a particle diameter of 1 nm to 50 nm was obtained. The nanophosphor obtained as described above was washed with acetone or ethanol and then was dispersed and stored in a non-polar solvent such as hexane, toluene, or chloroform.

Figure 26:
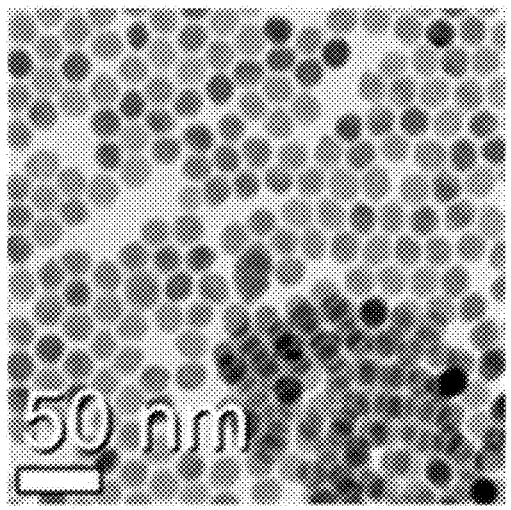
FIG. 26 is a TEM image of core/shell/shell/shell nanoparticles according to an embodiment of the present invention.

FIG. 26 is a TEM image of the core/shell/shell/shell upconversion nanophosphor synthesized in Embodiment 16 of the present invention, and shows that a particle diameter is additionally increased due to a shell formed around the core/shell/shell structure.

<Embodiment 17> Synthesis of Core/Shell/Shell/Shell/Shell Red/Green-Emitting Upconversion Nanophosphor A core/shell/shell/shell/shell nanophosphor including cores using the LiErF$_4$:Tm$^{3+}$/LiGdF$_4$/LiGdF$_4$:Yb$^{3+}$,Er$^{3+}$/LiYF$_4$:Nd$^{3+}$,Yb$^{3+}$ nanoparticles synthesized in Embodiment 16, and further including a LiGdF$_4$ compound was synthesized. For convenience, the core/shell/shell/shell/shell structure may be understood as a core/first shell/second shell/third shell/fourth shell structure.

2 mmol of gadolinium chloride hydrate (GdCl$_3$.6H$_2$O) was mixed with a solution including oleic acid and 1-octadecene and heat treatment was performed at 150° C. for 30 minutes to produce a mixed solution including a lanthanide complex (a first mixed solution production step).

The first mixed solution was mixed with the solution including the LiErF$_4$:Tm$^{3+}$/LiGdF$_4$/LiGdF$_4$:Yb$^{3+}$,Er$^{3+}$/LiYF$_4$:Nd$^{3+}$,Yb$^{3+}$ nanoparticles synthesized in Embodiment 16, to produce a second mixed solution.

20 ml of a methanol solution including 5 mmol of lithium hydroxide and 8 mmol of ammonium fluoride was produced (a third mixed solution production step) and then was mixed with the mixed solution including the lanthanide complex (a reaction solution production step).

After sufficiently mixed, methanol was removed and then heat treatment was performed in an inert gas atmosphere. In this case, when the temperature of heat treatment was lower than 200° C., single-phase tetragonal nanocrystals might not be completely formed and thus the phosphor might not exhibit intense luminescence. When the temperature of heat treatment was higher than 370° C., aggregation of particles due to overreaction might lead to very large and non-uniform particle diameters and thus a reduction in brightness may be caused. Therefore, the temperature of heat treatment might be 200° C. to 370° C. and the time of heat treatment might be 10 minutes to 4 hours (a nanoparticle formation step). After the heat treatment process was finished and a cooling process was performed to room temperature, a colloidal nanophosphor having a particle diameter of 1 nm to 60 nm was obtained. The nanophosphor obtained as described above was washed with acetone or ethanol and then was dispersed and stored in a non-polar solvent such as hexane, toluene, or chloroform.

Figure 27:
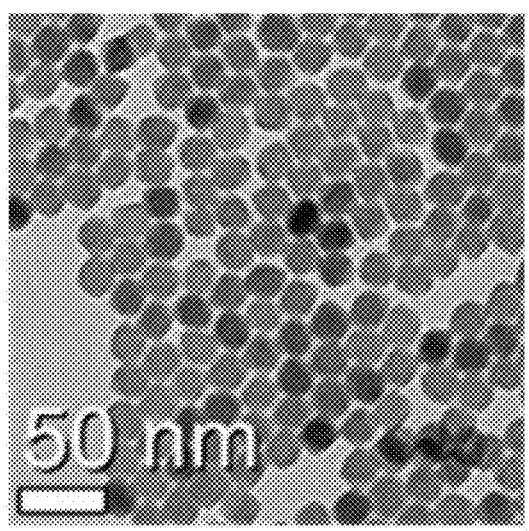
FIG. 27 is a TEM image of core/shell/shell/shell/shell nanoparticles according to an embodiment of the present invention.

FIG. 27 is a TEM image of the core/shell/shell/shell/shell upconversion nanophosphor synthesized in Embodiment 17 of the present invention, and shows that a particle diameter is additionally increased due to a shell formed around the core/shell/shell/shell structure.

<Embodiment 18> Synthesis of Core/Shell/Shell/Shell/Shell/Shell Red/Green/Blue-Emitting Upconversion Nanophosphor A core/shell/shell/shell/shell/shell nanophosphor including cores using the $LiErF_4:Tm^{3+}/LiGdF_4/LiGdF_4:Yb^{3+},Er^{3+}/LiYF_4:Nd^{3+},Yb^{3+}/LiGdF_4$ nanoparticles synthesized in Embodiment 17, and further including a $LiYbF_4:Tm^{3+}$ compound was synthesized. For convenience, the core/shell/shell/shell/shell/shell structure may be understood as a core/first shell/second shell/third shell/fourth shell/fifth shell structure.

0.99 mmol of ytterbium chloride hydrate ($YbCl_3.6H_2O$), 0.01 mmol of thulium chloride hydrate ($TmCl_3.6H_2O$) were mixed with a solution including oleic acid and 1-octadecene and heat treatment was performed at 150° C. for 30 minutes to produce a mixed solution including a lanthanide complex (a first mixed solution production step).

The first mixed solution was mixed with the solution including the $LiErF_4:Tm^{3+}/LiGdF_4/LiGdF_4:Yb^{3+},Er^{3+}/LiYF_4:Nd^{3+},Yb^{3+}/LiGdF_4$ nanoparticles synthesized in Embodiment 17, to produce a second mixed solution.

10 ml of a methanol solution including 2.5 mmol of lithium hydroxide and 4 mmol of ammonium fluoride was produced (a third mixed solution production step) and then was mixed with the mixed solution including the lanthanide complex (a reaction solution production step).

After sufficiently mixed, methanol was removed and then heat treatment was performed in an inert gas atmosphere. In this case, when the temperature of heat treatment was lower than 200° C., single-phase tetragonal nanocrystals might not be completely formed and thus the phosphor might not exhibit intense luminescence. When the temperature of heat treatment was higher than 370° C., aggregation of particles due to overreaction might lead to very large and non-uniform particle diameters and thus a reduction in brightness may be caused. Therefore, the temperature of heat treatment might be 200° C. to 370° C. and the time of heat treatment might be 10 minutes to 4 hours (a nanoparticle formation step). After the heat treatment process was finished and a cooling process was performed to room temperature, a colloidal nanophosphor having a particle diameter of 1 nm to 70 nm was obtained. The nanophosphor obtained as described above was washed with acetone or ethanol and then was dispersed and stored in a non-polar solvent such as hexane, toluene, or chloroform.

Figure 28:
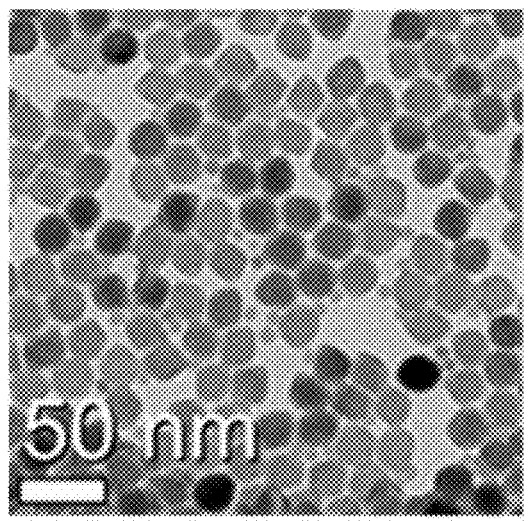
FIG. 28 is a TEM image of core/shell/shell/shell/shell/shell nanoparticles according to an embodiment of the present invention.

FIG. 28 is a TEM image of the core/shell/shell/shell/shell/shell upconversion nanophosphor synthesized in Embodiment 18 of the present invention, and shows that a particle diameter is additionally increased due to a shell formed around the core/shell/shell/shell/shell structure.

<Embodiment 19> Synthesis of Core/Shell/Shell/Shell/Shell/Shell/Shell Red/Green/Blue-Emitting Upconversion Nanophosphor A core/shell/shell/shell/shell/shell/shell nanophosphor including cores using the $LiErF_4:Tm^{3+}/LiGdF_4/LiGdF_4:Yb^{3+},Er^{3+}/LiYF_4:Nd^{3+},Yb^{3+}/LiGdF_4/LiYbF_4:Tm^{3+}$ nanoparticles synthesized in Embodiment 18, and further including a $LiGdF_4$ compound was synthesized. For convenience, the core/shell/shell/shell/shell/shell/shell structure may be understood as a core/first shell/second shell/third shell/fourth shell/fifth shell/sixth shell structure.

2 mmol of gadolinium chloride hydrate ($GdCl_3.6H_2O$) was mixed with a solution including oleic acid and 1-octadecene and heat treatment was performed at 150° C. for 30 minutes to produce a mixed solution including a lanthanide complex (a first mixed solution production step).

The first mixed solution was mixed with the solution including the $LiErF_4:Tm^{3+}/LiGdF_4/LiGdF_4:Yb^{3+},Er^{3+}/LiYF_4:Nd^{3+},Yb^{3+}/LiGdF_4/LiYbF_4:Tm^{3+}$ nanoparticles synthesized in Embodiment 18, to produce a second mixed solution.

20 ml of a methanol solution including 5 mmol of lithium hydroxide and 8 mmol of ammonium fluoride was produced (a third mixed solution production step) and then was mixed with the mixed solution including the lanthanide complex (a reaction solution production step).

After sufficiently mixed, methanol was removed and then heat treatment was performed in an inert gas atmosphere. In this case, when the temperature of heat treatment was lower than 200° C., single-phase tetragonal nanocrystals might not be completely formed and thus the phosphor might not exhibit intense luminescence. When the temperature of heat treatment was higher than 370° C., aggregation of particles due to overreaction might lead to very large and non-uniform particle diameters and thus a reduction in brightness may be caused. Therefore, the temperature of heat treatment might be 200° C. to 370° C. and the time of heat treatment might be 10 minutes to 4 hours (a nanoparticle formation step). After the heat treatment process was finished and a cooling process was performed to room temperature, a colloidal nanophosphor having a particle diameter of 1 nm to 80 nm was obtained. The nanophosphor obtained as described above was washed with acetone or ethanol and then was dispersed and stored in a non-polar solvent such as hexane, toluene, or chloroform.

Figure 29:
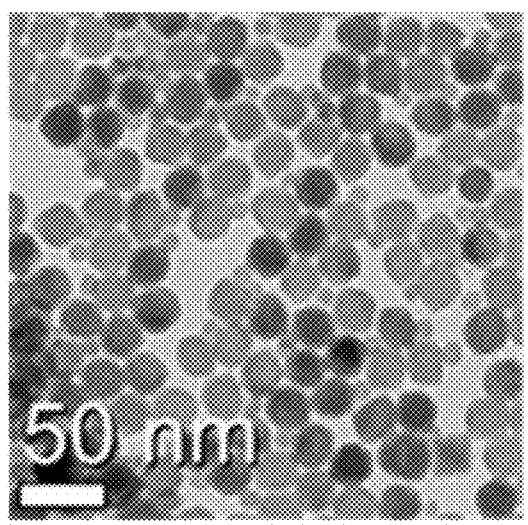
FIG. 29 is a TEM image of core/shell/shell/shell/shell/shell/shell nanoparticles according to an embodiment of the present invention.
Figure 30:
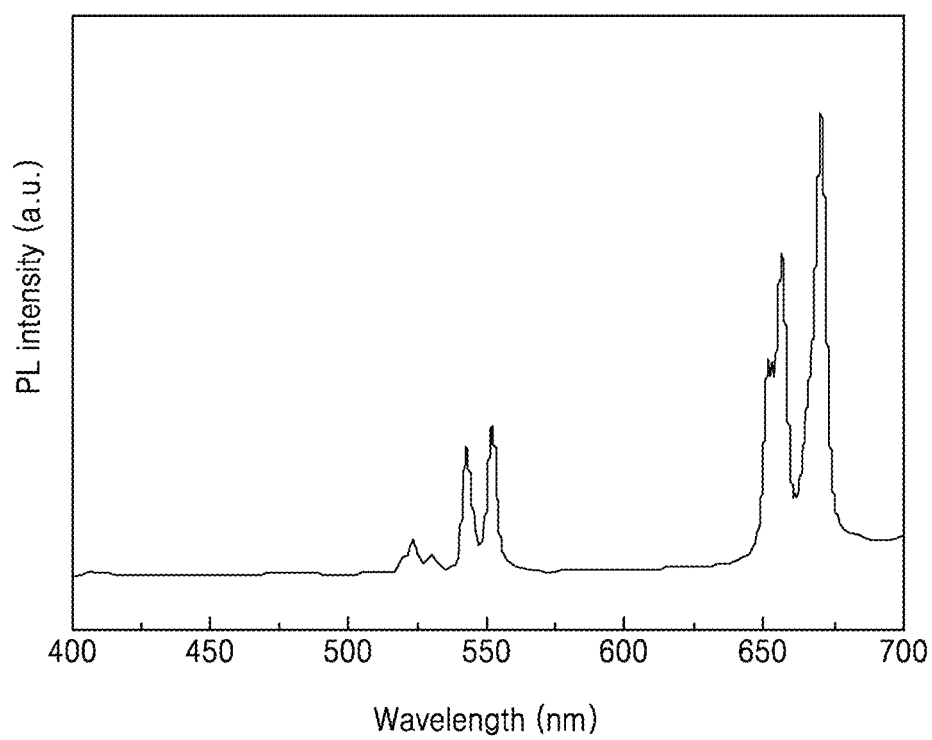
FIG. 30 shows a PL spectrum of core/shell/shell/shell/shell/shell/shell nanoparticles according to an embodiment of the present invention under an 800 nm NIR excitation condition.
Figure 31:
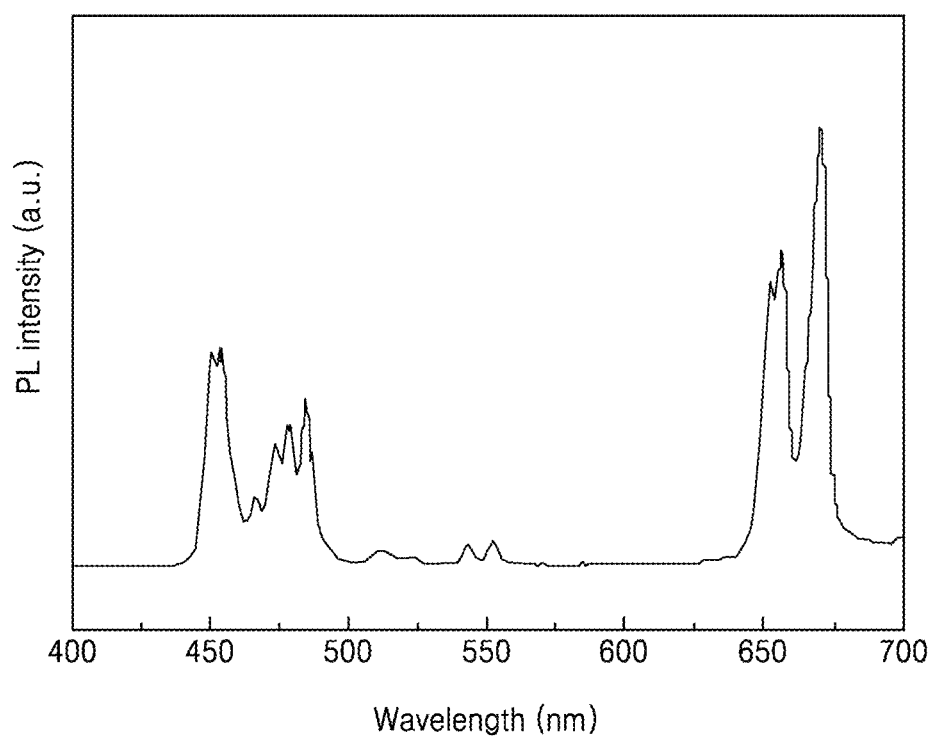
FIG. 31 shows a PL spectrum of core/shell/shell/shell/shell/shell/shell nanoparticles according to an embodiment of the present invention under a 980 nm NIR excitation condition.
Figure 32:
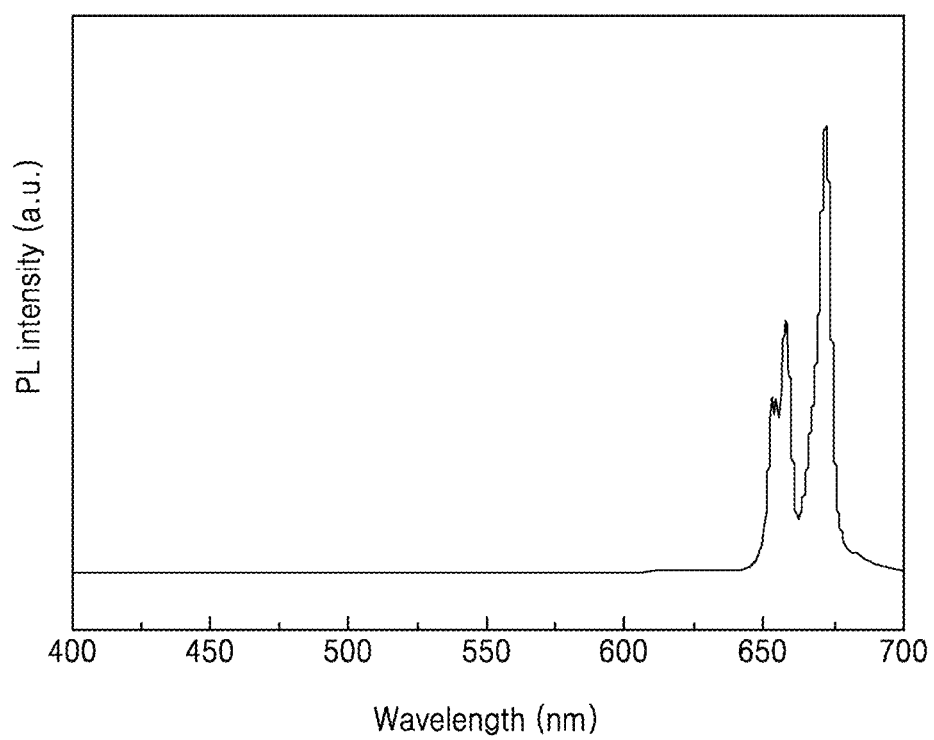
FIG. 32 shows a PL spectrum of core/shell/shell/shell/shell/shell/shell nanoparticles according to an embodiment of the present invention under a 1532 nm NIR excitation condition.

FIG. 29 is a TEM image of the core/shell/shell/shell/shell/shell/shell upconversion nanophosphor synthesized in Embodiment 19 of the present invention, and shows that a particle diameter is additionally increased due to a shell formed around the core/shell/shell/shell/shell/shell structure. PL spectra of FIGS. 30 to 32 show that the core/shell/shell/shell/shell/shell/shell upconversion nanophosphor synthesized in Embodiment 19 emits green light under 800 nm NIR excitation, emits blue light under 980 nm NIR excitation, and emits red light under 1532 nm NIR excitation.

<Embodiment 20> Synthesis of Polymer Composite Including Core/Shell/Shell/Shell/Shell/Shell/Shell Blue/Green/Red-Emitting Upconversion Nanophosphor A polymer composite was synthesized by mixing polydimethylsiloxane (PDMS) polymer with the $LiYbF_4:Tm^{3+}/LiGdF_4/LiGdF_4:Yb^{3+},Er^{3+}/LiYF_4:Nd^{3+},Yb^{3+}/LiGdF_4/LiErF_4:Tm^{3+}/LiGdF_4$ core/shell/shell/shell/shell/shell/shell nanophosphor synthesized in Embodiment 7. For convenience, the core/shell/shell/shell/shell/shell/shell structure may be understood as a core/first shell/second shell/third shell/fourth shell/fifth shell/sixth shell structure.

0.4 mL of the core/shell/shell/shell/shell/shell/shell nanophosphor solution synthesized in Embodiment 7 was mixed with 5 mL of Sylgard 184 PDMS polymer and 0.5 mL of a curing agent and then heat treatment was performed at 80° C. for 1 hour to synthesize a polymer composite.

Figure 33:
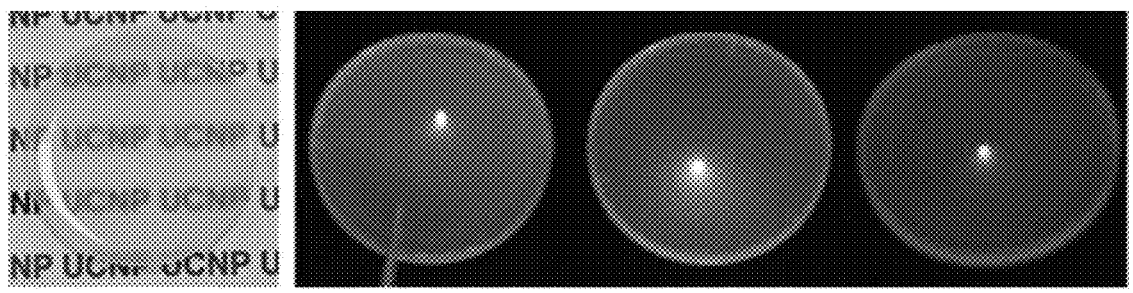
FIG. 33 includes a photographic image of a core/shell/shell/shell/shell/shell nanophosphor-polymer composite according to an embodiment of the present invention, and a PL image thereof under 800 nm, 980 nm, and 1532 nm NIR excitation conditions.

FIG. 33 includes a photographic image and a PL image of the core/shell/shell/shell/shell/shell/shell upconversion nanophosphor-polymer composite synthesized in Embodiment 20 of the present invention, and shows that, like the core/shell/shell/shell/shell/shell/shell upconversion nanophosphor, the nanophosphor-polymer composite also emits green light under 800 nm NIR excitation, emits blue light under 980 nm NIR excitation, and emits red light under 1532 nm NIR excitation.

<Comparative Example 1> Synthesis of Upconversion Core Nanophosphor Doped with 0.25 Mmol of $Yb^{3+}$ and 0.005 Mmol of $Tm^{3+}$ 0.745 mmol of yttrium chloride hydrate ($YCl_3.6H_2O$), 0.25 mmol of ytterbium chloride hydrate ($YbCl_3.6H_2O$), and 0.005 mmol of thulium chloride hydrate ($TmCl_3.6H_2O$) were mixed with a solution including oleic acid and 1-octadecene and heat treatment was performed at 150° C. for 30 minutes to produce a mixed solution including a lanthanide complex (a first mixed solution production step).

10 ml of a methanol solution including 2.5 mmol of sodium hydroxide and 4 mmol of ammonium fluoride was produced (a second mixed solution production step) and then was mixed with the mixed solution including the lanthanide complex (a reaction solution production step).

After sufficiently mixed, methanol was removed and then heat treatment was performed in an inert gas atmosphere. In this case, when the temperature of heat treatment was lower than 200° C., single-phase tetragonal nanocrystals might not be completely formed and thus the phosphor might not exhibit intense luminescence. When the temperature of heat treatment was higher than 370° C., aggregation of particles due to overreaction might lead to very large and non-uniform particle diameters and thus a reduction in brightness may be caused. Therefore, the temperature of heat treatment might be 200° C. to 370° C. and the time of heat treatment might be 10 minutes to 4 hours (a nanoparticle formation step). After the heat treatment process was finished and a cooling process was performed to room temperature, a colloidal nanophosphor having a particle diameter of 10 nm to 40 nm was obtained. The nanophosphor obtained as described above was washed with acetone or ethanol and then was dispersed and stored in a non-polar solvent such as hexane, toluene, or chloroform.

<Comparative Example 2> Synthesis of Blue-Emitting Core/Shell Upconversion Nanophosphor A core/shell nanophosphor including cores using the $NaYF_4:Yb^{3+}_{0.25},Tm^{3+}_{0.005}$ nanoparticles synthesized in Comparative Example 1, and further including a fluoride compound was synthesized.

1 mmol of yttrium chloride hydrate ($YCl_3.6H_2O$) was mixed with a solution including oleic acid and 1-octadecene and heat treatment was performed at 150° C. for 30 minutes to produce a mixed solution including a lanthanide complex (a first mixed solution production step).

The first mixed solution was mixed with the solution including the $NaYF_4:Yb^{3+},Tm^{3+}$ nanoparticles synthesized in Comparative Example 1, to produce a second mixed solution.

10 ml of a methanol solution including 2.5 mmol of sodium hydroxide and 4 mmol of ammonium fluoride was produced (a second mixed solution production step) and then was mixed with the mixed solution including the lanthanide complex (a reaction solution production step).

After sufficiently mixed, methanol was removed and then heat treatment was performed in an inert gas atmosphere. In this case, when the temperature of heat treatment was lower than 200° C., single-phase tetragonal nanocrystals might not be completely formed and thus the phosphor might not exhibit intense luminescence. When the temperature of heat treatment was higher than 370° C., aggregation of particles due to overreaction might lead to very large and non-uniform particle diameters and thus a reduction in brightness may be caused. Therefore, the temperature of heat treatment might be 200° C. to 370° C. and the time of heat treatment might be 10 minutes to 4 hours (a nanoparticle formation step). After the heat treatment process was finished and a cooling process was performed to room temperature, a colloidal nanophosphor having a particle diameter of 20 nm to 50 nm was obtained. The nanophosphor obtained as described above was washed with acetone or ethanol and then was dispersed and stored in a non-polar solvent such as hexane, toluene, or chloroform.

<Comparative Example 3> Synthesis of Upconversion Core Nanophosphor Doped with 0.18 Mmol of $Yb^{3+}$ and 0.02 Mmol of $Er^{3+}$ 0.8 mmol of yttrium chloride hydrate ($YCl_3.6H_2O$), 0.18 mmol of ytterbium chloride hydrate ($YbCl_3.6H_2O$), 0.02 mmol of erbium chloride hydrate ($ErCl_3.6H_2O$), and 3.1 mmol of sodium oleate ($C_{18}H_{33}O_2Na$) were weighed, a certain amount of a mixed solvent of water, ethanol, and hexane was added, and then heat treatment was performed at 70° C. to form a lanthanide complex (a complex formation step). The complex was mixed with a solution including oleic acid and 1-octadecene and heat treatment was performed at 150° C. for 30 minutes to produce a mixed solution including the lanthanide complex (a first mixed solution production step).

10 ml of a methanol solution including 2.5 mmol of sodium hydroxide and 4 mmol of ammonium fluoride was produced (a second mixed solution production step) and then was mixed with the mixed solution including the lanthanide complex (a reaction solution production step).

After sufficiently mixed, methanol was removed and then heat treatment was performed in an inert gas atmosphere. In this case, when the temperature of heat treatment was lower than 200° C., single-phase tetragonal nanocrystals might not be completely formed and thus the phosphor might not exhibit intense luminescence. When the temperature of heat treatment was higher than 370° C., aggregation of particles due to overreaction might lead to very large and non-uniform particle diameters and thus a reduction in brightness may be caused. Therefore, the temperature of heat treatment might be 200° C. to 370° C. and the time of heat treatment might be 10 minutes to 4 hours (a nanoparticle formation step). After the heat treatment process was finished and a cooling process was performed to room temperature, a colloidal nanophosphor having a particle diameter of 10 nm to 40 nm was obtained. The nanophosphor obtained as described above was washed with acetone or ethanol and then was dispersed and stored in a non-polar solvent such as hexane, toluene, or chloroform.

<Comparative Example 4> Synthesis of Green-Emitting Core/Shell Upconversion Nanophosphor A core/shell nanophosphor including cores using the $NaYF_4:Yb^{3+}_{0.18},Er^{3+}_{0.02}$ nanoparticles synthesized in Comparative Example 3, and further including a fluoride compound was synthesized.

1 mmol of yttrium chloride hydrate ($YCl_3 \cdot 6H_2O$) was mixed with a solution including oleic acid and 1-octadecene and heat treatment was performed at 150° C. for 30 minutes to produce a mixed solution including a lanthanide complex (a first mixed solution production step).

The first mixed solution was mixed with the solution including the $NaYF_4:Yb^{3+},Er^{3+}$ nanoparticles synthesized in Comparative Example 3, to produce a second mixed solution.

10 ml of a methanol solution including 2.5 mmol of sodium hydroxide and 4 mmol of ammonium fluoride was produced (a second mixed solution production step) and then was mixed with the mixed solution including the lanthanide complex (a reaction solution production step).

After sufficiently mixed, methanol was removed and then heat treatment was performed in an inert gas atmosphere. In this case, when the temperature of heat treatment was lower than 200° C., single-phase tetragonal nanocrystals might not be completely formed and thus the phosphor might not exhibit intense luminescence. When the temperature of heat treatment was higher than 370° C., aggregation of particles due to overreaction might lead to very large and non-uniform particle diameters and thus a reduction in brightness may be caused. Therefore, the temperature of heat treatment might be 200° C. to 370° C. and the time of heat treatment might be 10 minutes to 4 hours (a nanoparticle formation step). After the heat treatment process was finished and a cooling process was performed to room temperature, a colloidal nanophosphor having a particle diameter of 20 nm to 50 nm was obtained. The nanophosphor obtained as described above was washed with acetone or ethanol and then was dispersed and stored in a non-polar solvent such as hexane, toluene, or chloroform.

<Comparative Example 5> Synthesis of Red-Emitting Upconversion Core Nanophosphor 0.995 mmol of erbium chloride hydrate ($ErCl_3 \cdot 6H_2O$), 0.005 mmol of thulium chloride hydrate ($TmCl_3 \cdot 6H_2O$), and 3.1 mmol of sodium oleate ($C_{18}H_{33}O_2Na$) were weighed, a certain amount of a mixed solvent of water, ethanol, and hexane was added, and then heat treatment was performed at 70° C. to form a lanthanide complex (a complex formation step). The complex was mixed with a solution including oleic acid and 1-octadecene and heat treatment was performed at 150° C. for 30 minutes to produce a mixed solution including the lanthanide complex (a first mixed solution production step).

10 ml of a methanol solution including 2.5 mmol of sodium hydroxide and 4 mmol of ammonium fluoride was produced (a second mixed solution production step) and then was mixed with the mixed solution including the lanthanide complex (a reaction solution production step).

After sufficiently mixed, methanol was removed and then heat treatment was performed in an inert gas atmosphere. In this case, when the temperature of heat treatment was lower than 200° C., single-phase tetragonal nanocrystals might not be completely formed and thus the phosphor might not exhibit intense luminescence. When the temperature of heat treatment was higher than 370° C., aggregation of particles due to overreaction might lead to very large and non-uniform particle diameters and thus a reduction in brightness may be caused. Therefore, the temperature of heat treatment might be 200° C. to 370° C. and the time of heat treatment might be 10 minutes to 4 hours (a nanoparticle formation step). After the heat treatment process was finished and a cooling process was performed to room temperature, a colloidal nanophosphor having a particle diameter of 10 nm to 40 nm was obtained. The nanophosphor obtained as described above was washed with acetone or ethanol and then was dispersed and stored in a non-polar solvent such as hexane, toluene, or chloroform.

<Comparative Example 6> Synthesis of Red-Emitting Core/Shell Upconversion Nanophosphor A core/shell nanophosphor including cores using the $NaErF_4:Tm^{3+}_{0.005}$ nanoparticles synthesized in Comparative Example 5, and further including a fluoride compound was synthesized.

1 mmol of yttrium chloride hydrate ($YCl_3 \cdot 6H_2O$) was mixed with a solution including oleic acid and 1-octadecene and heat treatment was performed at 150° C. for 30 minutes to produce a mixed solution including a lanthanide complex (a first mixed solution production step).

The first mixed solution was mixed with the solution including the $NaErF_4:Tm^{3+}$ nanoparticles synthesized in Comparative Example 5, to produce a second mixed solution.

10 ml of a methanol solution including 2.5 mmol of sodium hydroxide and 4 mmol of ammonium fluoride was produced (a second mixed solution production step) and then was mixed with the mixed solution including the lanthanide complex (a reaction solution production step).

After sufficiently mixed, methanol was removed and then heat treatment was performed in an inert gas atmosphere. In this case, when the temperature of heat treatment was lower than 200° C., single-phase tetragonal nanocrystals might not be completely formed and thus the phosphor might not exhibit intense luminescence. When the temperature of heat treatment was higher than 370° C., aggregation of particles due to overreaction might lead to very large and non-uniform particle diameters and thus a reduction in brightness may be caused. Therefore, the temperature of heat treatment might be 200° C. to 370° C. and the time of heat treatment might be 10 minutes to 4 hours (a nanoparticle formation step). After the heat treatment process was finished and a cooling process was performed to room temperature, a colloidal nanophosphor having a particle diameter of 20 nm to 50 nm was obtained. The nanophosphor obtained as described above was washed with acetone or ethanol and then was dispersed and stored in a non-polar solvent such as hexane, toluene, or chloroform.

<Comparative Example 7> Production of Mixed Solution of Blue-Emitting, Green-Emitting, Red-Emitting Core/Shell Upconversion Nanophosphors A mixed solution of blue-emitting, green-emitting, red-emitting upconversion nanophosphors was produced by mixing 225 µL of the $NaYF_4:Yb^{3+},Tm^{3+}/NaYF_4$ core/shell nanophosphor solution, 375 µL of the $NaYF_4:Yb^{3+},Er^{3+}/NaYF_4$ core/shell nanophosphor solution, and 400 µL of the $NaErF_4:Tm^{3+}/NaYF_4$ core/shell nanophosphor solution, which were synthesized in Comparative Examples 1 to 6.

Figure 34:
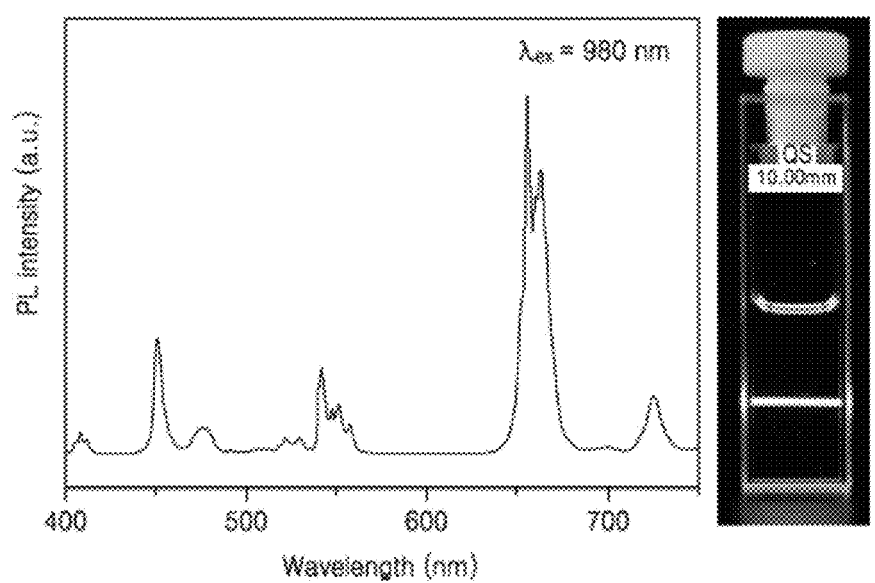
FIG. 34 includes a PL spectrum and a PL image of a nanophosphor according to a comparative example of the present invention under a 980 nm NIR excitation condition.

A PL spectrum and a PL image of FIG. 34 show that blue, green, and red emission is not observed but white light made by combining the colors is observed in the upconversion nanophosphor solution synthesized in Comparative Example 7.

The nanophosphor according to various embodiments of the present invention may emit light of various colors depending on a combination of wavelengths of an excitation light source. Alternatively, the nanophosphor may emit light of various colors depending on a combination of a wavelength and output power of an excitation light source.

The nanoparticles may have a diameter of 1 nm to 80 nm.

The nanoparticles may have upconversion properties.

A polymer composite according to another aspect of the present invention may include the above-described nanophosphor according to various embodiments of the present invention.

A display device according to still another aspect of the present invention may include a polymer composite including the above-described nanophosphor according to various embodiments of the present invention.

A fluorescent contrast agent according to still another aspect of the present invention may include the above-described nanophosphor according to various embodiments of the present invention.

Anti-counterfeiting code according to still another aspect of the present invention may include the above-described nanophosphor according to various embodiments of the present invention.

As described in detail above, blue, green, and red luminescence may be achieved using a core/multishell nanophosphor particle, and an emission color may be tuned by controlling a wavelength of an excitation laser beam. In addition, when two or more wavelengths of the excitation laser beam are combined, light of various colors may be emitted by inducing a combination of blue, green, and red, and thus a full-color-tunable upconversion nanophosphor may be obtained.

An inorganic upconversion nanophosphor synthesized according to the present invention may be applied not only to the field of transparent displays but also to the field of security using fluorescence by using the full-color-tunable properties thereof. In addition, since NIR light is used, the upconversion nanophosphor may be applied to the fields of bio imaging contrast agents and disease diagnosis.

While the present invention has been particularly shown and described with reference to embodiments thereof, it will be understood by one of ordinary skill in the art that various changes in form and details may be made therein without departing from the scope of the invention as defined by the following claims.

The embodiments should be considered in a descriptive sense only and not for purposes of limitation. Therefore, the scope of the invention is defined not by the detailed description of the invention but by the following claims, and all differences within the scope will be construed as being included in the present invention.

What is claimed is:

1. A core/multishell tetragonal upconversion nanophosphor capable of being excited by near-infrared (NIR) light having wavelengths of 800±20 nm, 980±20 nm, and 1532±20 nm to emit light of blue, green, red, and combinations thereof,
wherein the upconversion nanophosphor comprises a structure of a blue-emitting core, a green-emitting shell, and a red-emitting shell, or the upconversion nanophosphor comprises a structure of a red-emitting core, a green-emitting shell, and a blue-emitting shell,
wherein the light of green is emitted under 800±20 nm NIR excitation, the light of blue is emitted under 980±20 nm NIR excitation, and the light of red is emitted under 1532±20 nm NIR excitation.

2. The upconversion nanophosphor of claim 1, comprising the structure of the blue-emitting core, the green-emitting shell, and the red-emitting shell,
wherein the green-emitting shell is provided on at least a partial surface of the blue-emitting core, and the red-emitting shell is provided on at least a partial surface of the blue-emitting core and the green-emitting shell.

3. The upconversion nanophosphor of claim 1, further comprising a crystalline shell between the blue-emitting core, the green-emitting shell, and the red-emitting shell, and at an outermost layer.

4. The upconversion nanophosphor of claim 1, comprising the structure of the blue-emitting core, the red-emitting shell, and the green-emitting shell,
wherein the red-emitting shell is provided on at least a partial surface of the blue-emitting core, and the green-emitting shell is provided on at least a partial surface of the blue-emitting core and the red-emitting shell.

5. The upconversion nanophosphor of claim 4, further comprising a crystalline shell between the blue-emitting core, the red-emitting shell, and the green-emitting shell, and at an outermost layer.

6. The upconversion nanophosphor of claim 1, comprising the structure of the red-emitting core, the green-emitting shell, and the blue-emitting shell,
wherein the green-emitting shell is provided on at least a partial surface of the red-emitting core, and the blue-emitting shell is provided on at least a partial surface of the red-emitting core and the green-emitting shell.

7. The upconversion nanophosphor of claim 6, further comprising a crystalline shell between the red-emitting core, the green-emitting shell, and the blue-emitting shell, and at an outermost layer.

8. The upconversion nanophosphor of claim 1, comprising
the structure of the blue-emitting core, the green-emitting shell, and the red-emitting shell, wherein
the blue-emitting core a having a $Tm^{3+}$-doped fluoride-based nanoparticle represented by Chemical Formula 1;
a first crystalline shell represented by Chemical Formula 2;
the green-emitting shell having a $Yb^{3+}/Er^{3+}$-co-doped crystalline composition represented by Chemical Formula 3;
an absorption shell having a $Nd^{3+}/Yb^{3+}$-co-doped crystalline composition represented by Chemical Formula 4;
a second crystalline shell represented by Chemical Formula 5;
the red-emitting shell having a $Tm^{3+}$-doped crystalline composition represented by Chemical Formula 6; and
an outermost shell provided as a crystalline shell represented by Chemical Formula 7;

$$LiYb_{1-a-b}L_bF_4:Tm^{3+}{}_a \qquad \text{[Chemical Formula 1]}$$

In Chemical Formula 1, a is a real number of 0<a≤1, b is a real number of 0≤b≤1 and satisfying a condition of 0<a+b≤1, and L is any one selected from the group consisting of yttrium (Y), lanthanum (La), cerium (Ce), praseodymium (Pr), neodymium (Nd), promethium (Pm), samarium (Sm), europium (Eu), terbium (Tb), dysprosium (Dy), holmium (Ho), erbium (Er), lutetium (Lu), gadolinium (Gd) and combinations thereof;

$$LiGd_{1-c}M_cF_4 \qquad \text{[Chemical Formula 2]}$$

In Chemical Formula 2, c is a real number of 0≤c≤1, and M is any one selected from the group consisting of rare-earth elements comprising Y, La, Ce, Pr, Nd, Pm, Sm, Eu, Tb, Dy, Ho, Er, thulium (Tm), ytterbium (Yb), and Lu, and combinations thereof;

$$LiGd_{1-d-e-f}N_fF_4:Yb^{3+}{}_d,Er^{3+}{}_e \qquad \text{[Chemical Formula 3]}$$

In Chemical Formula 3, d is a real number of 0<d≤0.5, e is a real number of 0<e≤0.5, f is a real number of 0≤f≤1 and satisfying a condition of 0<d+e+f<1, and N is any one selected from the group consisting of rare-earth elements comprising Y, La, Ce, Pr, Nd, Pm, Sm, Dy, Ho, Tm, and Lu, and combinations thereof;

$$LiY_{1-g-h-i}Q_iF_4:Nd^{3+}{}_g,Yb^{3+}{}_h \qquad \text{[Chemical Formula 4]}$$

In Chemical Formula 4, g is a real number of 0<g≤1, h is a real number of 0<h≤0.5 and is satisfying a condition of 0<g+h≤1, i is a real number of 0≤i≤1 and satisfying a condition of 0<g+h+i≤1, and Q is any one selected from the group consisting of rare-earth elements comprising La, Ce, Pr, Pm, Sm, Eu, gadolinium (Gd), Tb, Dy, Ho, Er, Tm, and Lu, and combinations thereof;

$$LiGd_{1-j}R_jF_4 \qquad \text{[Chemical Formula 5]}$$

In Chemical Formula 5, j is satisfying a condition of a real number of 0≤j≤1, and R is any one selected from the group consisting of rare-earth elements comprising Y, La, Ce, Pr, Nd, Pm, Sm, Eu, Tb, Dy, Ho, Er, Tm, Yb, and Lu, and combinations thereof[;

$$LiEr_{1-k-l}T_lF_4:Tm^{3+}{}_k \qquad \text{[Chemical Formula 6]}$$

In Chemical Formula 6, k is a real number of 0<k≤0.5, l is a real number of 0≤l<1 and satisfying a condition of 0<k+l<1, and T is any one selected from the group consisting of rare-earth elements comprising Y, La, Ce, Pr, Nd, Pm, Sm, Eu, Gd, Tb, Dy, Ho, Yb, and Lu, and combinations thereof;

$$LiGd_{1-m}Z_mF_4 \qquad \text{[Chemical Formula 7]}$$

In Chemical Formula 7, m is satisfying a condition of a real number of 0≤m≤1, and Z is any one selected from the group consisting of rare-earth elements comprising Y, La, Ce, Pr, Nd, Pm, Sm, Eu, Tb, Dy, Ho, Er, Tm, Yb, and Lu, and combinations thereof.

9. The upconversion nanophosphor of claim 8, wherein
the first crystalline shell represented by Chemical Formula 2 is provided on at least a partial surface of the blue-emitting core;
the green-emitting shell represented by Chemical Formula 3 is provided on at least a partial surface of the blue-emitting core and the crystalline shell;
the absorption shell represented by Chemical Formula 4 is provided on at least a partial surface of the blue-emitting core, the first crystalline shell, and the green-emitting shell;
the second crystalline shell represented by Chemical Formula 5 is provided on at least a partial surface of the blue-emitting core, the first crystalline shell, the green-emitting shell, and the absorption shell;
the red-emitting shell represented by Chemical Formula 6 is provided on at least a partial surface of the blue-emitting core, the first crystalline shell, the green-emitting shell, the absorption shell, and the second crystalline shell; and
the outermost shell represented by Chemical Formula 7 is provided on at least a partial surface of the blue-emitting core, the first crystalline shell, the green-emitting shell, the absorption shell, the second crystalline shell, and the red-emitting shell.

10. The upconversion nanophosphor of claim 1, comprising
the structure of the blue-emitting core, the green-emitting shell, and the red-emitting shell, wherein
the blue-emitting core having a $Tm^{3+}$-doped fluoride-based nanoparticle represented by Chemical Formula 8;
a first crystalline shell represented by Chemical Formula 9;
the red-emitting shell having a $Tm^{3+}$-doped crystalline composition represented by Chemical Formula 10;
a second crystalline shell represented by Chemical Formula 11;
the green-emitting shell having a $Yb^{3+}/Er^{3+}$-co-doped crystalline composition represented by Chemical Formula 12;
an absorption shell having a $Nd^{3+}/Yb^{3+}$-co-doped crystalline composition represented by Chemical Formula 13; and
an outermost shell provided as a crystalline shell represented by Chemical Formula 14

$$LiYb_{1-a-b}L_bF_4:Tm^{3+}{}_a \qquad \text{[Chemical Formula 8]}$$

In Chemical Formula 8, a is a real number of 0<a≤1, b is a real number of 0≤b≤1 and satisfying a condition of 0<a+b≤1, and L is any one selected from the group consisting of Y, La, Ce, Pr, Nd, Pm, Sm, Eu, Tb, Dy, Ho, Er, Lu, Gd and combinations thereof;

$$LiGd_{1-c}M_cF_4 \qquad \text{[Chemical Formula 9]}$$

In Chemical Formula 9, c is a real number of 0≤c≤1, and M is any one selected from the group consisting of rare-earth elements comprising Y, La, Ce, Pr, Nd, Pm, Sm, Eu, Tb, Dy, Ho, Er, Tm, Yb, and Lu, and combinations thereof;

$$LiEr_{1-k-l}T_lF_4:Tm^{3+}{}_k \qquad \text{[Chemical Formula 10]}$$

In Chemical Formula 10, k is a real number of 0<k≤0.5, l is a real number of 0≤l<1 and satisfying a condition of 0<k+l<1, and T is any one selected from the group consisting of rare-earth elements comprising Y, La, Ce, Pr, Nd, Pm, Sm, Eu, Gd, Tb, Dy, Ho, Yb, and Lu, and combinations thereof;

$$LiGd_{1-m}Z_mF_4 \qquad \text{[Chemical Formula 11]}$$

In Chemical Formula 11, m satisfying a condition of a real number of 0≤m≤1, and Z is any one selected from the group consisting of rare-earth elements comprising Y, La, Ce, Pr, Nd, Pm, Sm, Eu, Tb, Dy, Ho, Er, Tm, Yb, and Lu, and combinations thereof;

$$LiGd_{1-d-e-f}N_fF_4:Yb^{3+}{}_d,Er^{3+}{}_e \qquad \text{[Chemical Formula 12]}$$

In Chemical Formula 12, d is a real number of 0<d≤0.5, e is a real number of 0<e≤0.5, f is a real number of 0≤f≤1 and is satisfying a condition of 0<d+e+f<1, and N is any one selected from the group consisting of rare-earth elements comprising Y, La, Ce, Pr, Nd, Pm, Sm, Dy, Ho, Tm, and Lu, and combinations thereof;

$$LiY_{1-g-h-i}Q_iF_4:Nd^{3+}{}_g,Yb^{3+}{}_h \qquad \text{[Chemical Formula 13]}$$

In Chemical Formula 13, g is a real number of 0<g<1, his a real number of 0<h≤0.5 and is satisfying a condition of 0<g+h≤1, i is a real number of 0≤i≤1 and is satisfying a condition of 0<g+h+i≤1, and Q is any one selected from the group consisting of rare-earth elements comprising La, Ce, Pr, Pm, Sm, Eu, Gd, Tb, Dy, Ho, Er, Tm, and Lu, and combinations thereof[;

$$LiGd_{1-j}R_jF_4 \quad \text{[Chemical Formula 14]}$$

In Chemical Formula 14, j is satisfying a condition of a real number of $0 \leq j \leq 1$, and R is any one selected from the group consisting of rare-earth elements comprising Y, La, Ce, Pr, Nd, Pm, Sm, Eu, Tb, Dy, Ho, Er, Tm, Yb, and Lu, and combinations thereof.

11. The upconversion nanophosphor of claim 10, wherein the first crystalline shell represented by Chemical Formula 9 is provided on at least a partial surface of the blue-emitting core;
the red-emitting shell represented by Chemical Formula 10 is provided on at least a partial surface of the blue-emitting core and the first crystalline shell;
a second crystalline shell represented by Chemical Formula 11 is provided on at least a partial surface of the blue-emitting core, the first crystalline shell, and the red-emitting shell;
the green-emitting shell represented by Chemical Formula 12 is provided on at least a partial surface of the blue-emitting core, the first crystalline shell, the red-emitting shell and the second crystalline shell;
the absorption shell represented by Chemical Formula 13 is provided on at least a partial surface of the blue-emitting core, the first crystalline shell, the red-emitting shell, the second crystalline shell, and the green-emitting shell; and
the outermost shell represented by Chemical Formula 13 is provided on at least a partial surface of the blue-emitting core, the first crystalline shell, the red-emitting shell, the second crystalline shell, the green-emitting shell, and the absorption shell.

12. The upconversion nanophosphor of claim 1, comprising the structure of the red-emitting core, the green-emitting shell, and the blue-emitting shell, wherein
the red-emitting core having a $Tm^{3+}$-doped fluoride-based nanoparticle represented by Chemical Formula 15;
a first crystalline shell represented by Chemical Formula 16;
the green-emitting shell having a $Yb^{3+}/Er^{3+}$-co-doped crystalline composition represented by Chemical Formula 17;
an absorption shell having a $Nd^{3+}/Yb^{3+}$-co-doped crystalline composition represented by Chemical Formula 18;
a second crystalline shell represented by Chemical Formula 19;
the blue-emitting shell having a $Tm^{3+}$-doped crystalline composition represented by Chemical Formula 20; and
an outermost shell provided as a crystalline shell represented by Chemical Formula 21;

$$LiEr_{1-k-l}T_lF_4:Tm^{3+}_k \quad \text{[Chemical Formula 15]}$$

In Chemical Formula 15, k is a real number of $0<k\leq0.5$, l is a real number of $0\leq l<1$ and is satisfying a condition of $0<k+l<1$, and T is any one selected from the group consisting of rare-earth elements comprising Y, La, Ce, Pr, Nd, Pm, Sm, Eu, Gd, Tb, Dy, Ho, Yb, and Lu, and combinations thereof;

$$LiGd_{1-c}M_cF_4 \quad \text{[Chemical Formula 16]}$$

In Chemical Formula 16, c is a real number of $0\leq c\leq1$, and M is any one selected from the group consisting of rare-earth elements comprising Y, La, Ce, Pr, Nd, Pm, Sm, Eu, Tb, Dy, Ho, Er, Tm, Yb, and Lu, and combinations thereof;

$$LiGd_{1-d-e-f}N_fF_4:Yb^{3+}_d,Er^{3+}_e \quad \text{[Chemical Formula 17]}$$

In Chemical Formula 17, d is a real number of $0<d\leq0.5$, e is a real number of $0<e\leq0.5$, f is a real number of $0\leq f\leq 1$ and satisfying a condition of $0<d+e+f<1$, and N is any one selected from the group consisting of rare-earth elements comprising Y, La, Ce, Pr, Nd, Pm, Sm, Dy, Ho, Tm, and Lu, and combinations thereof;

$$LiY_{1-g-h-i}Q_iF_4:Nd^{3+}_g,Yb^{3+}_h \quad \text{[Chemical Formula 18]}$$

In Chemical Formula 18, g is a real number of $0<g\leq1$, h is a real number of $0<h\leq0.5$ and satisfying a condition of $0<g+h\leq1$, i is a real number of $0\leq i\leq1$ and satisfying a condition of $0<g+h+i\leq1$, and Q is any one selected from the group consisting of rare-earth elements comprising La, Ce, Pr, Pm, Sm, Eu, Gd, Tb, Dy, Ho, Er, Tm, and Lu, and combinations thereof;

$$LiGd_{1-j}R_jF_4 \quad \text{[Chemical Formula 19]}$$

In Chemical Formula 19, j is satisfying a condition of a real number of $0\leq j\leq1$, and R is any one selected from the group consisting of rare-earth elements comprising Y, La, Ce, Pr, Nd, Pm, Sm, Eu, Tb, Dy, Ho, Er, Tm, Yb, and Lu, and combinations thereof[;

$$LiYb_{1-a-b}L_bF_4:TM^{3+}_a \quad \text{[Chemical Formula 20]}$$

In Chemical Formula 20, a is a real number of $0<a\leq1$, b is a real number of $0\leq b\leq1$ and satisfying a condition of $0<a+b\leq1$, and L is any one selected from the group consisting of Y, La, Ce, Pr, Nd, Pm, Sm, Eu, Tb, Dy, Ho, Er, Lu, Gd and combinations thereof;

$$LiGd_{1-m}Z_mF_4 \quad \text{[Chemical Formula 21]}$$

In Chemical Formula 21, m is satisfying a condition of a real number of $0\leq m\leq1$, and Z is any one selected from the group consisting of rare-earth elements comprising Y, La, Ce, Pr, Nd, Pm, Sm, Eu, Tb, Dy, Ho, Er, Tm, Yb, and Lu, and combinations thereof.

13. The upconversion nanophosphor of claim 12, wherein the first crystalline shell represented by Chemical Formula 16 is provided on at least a partial surface of the red-emitting core;
a green-emitting shell represented by Chemical Formula 17 is provided on at least a partial surface of the red-emitting core and the first crystalline shell;
the absorption shell represented by Chemical Formula 18 is provided on at least a partial surface of the red-emitting core, the first shell, and the green-emitting shell;
a second crystalline shell represented by Chemical Formula 19 is provided on at least a partial surface of the red-emitting core, the first crystalline shell, the green-emitting shell, and the absorption shell;
the blue-emitting shell represented by Chemical Formula 20 is provided on at least a partial surface of the red-emitting core, the first crystalline shell, the green-emitting shell, the absorption shell, and the second crystalline shell; and
the outermost shell represented by Chemical Formula 21 is provided on at least a partial surface of the red-emitting core, the first crystalline shell, the green-emitting shell, the absorption shell, the second crystalline shell, and the blue-emitting shell.

14. The upconversion nanophosphor of claim 1, wherein the nanophosphor emits light of various colors depending on a combination of wavelengths of an excitation light source.

15. The upconversion nanophosphor of claim 1, wherein the nanophosphor emits light of various colors depending on a combination of a wavelength and output power of an excitation light source.

16. A polymer composite comprising the upconversion nanophosphor according to claim 1.

17. A display device comprising a polymer composite comprising the upconversion nanophosphor according to claim 1.

18. A fluorescent contrast agent comprising the upconversion nanophosphor according to claim 1.

19. Anti-counterfeiting code comprising the upconversion nanophosphor according to claim 1.

* * * * *